United States Patent
Vehovc et al.

(10) Patent No.: US 10,903,567 B2
(45) Date of Patent: Jan. 26, 2021

(54) CALIBRATING A PHASED ARRAY SYSTEM

(71) Applicant: Infineon Technologies AG, Neubiberg (DE)

(72) Inventors: Samo Vehovc, Unterhaching (DE); Ivan Tsvelykh, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 415 days.

(21) Appl. No.: 15/997,048

(22) Filed: Jun. 4, 2018

(65) Prior Publication Data

US 2019/0372218 A1 Dec. 5, 2019

(51) Int. Cl.
*H01Q 3/22* (2006.01)
*H01Q 3/26* (2006.01)
*H01Q 3/34* (2006.01)

(52) U.S. Cl.
CPC ............ *H01Q 3/267* (2013.01); *H01Q 3/34* (2013.01)

(58) Field of Classification Search
CPC . G01S 1/02; H01Q 3/267; H01Q 3/34; H01Q 3/22; H01Q 3/42; H01Q 25/00
USPC ........................................................ 342/371
See application file for complete search history.

(56) References Cited

U.S. PATENT DOCUMENTS

| | | | |
|---|---|---|---|
| 4,241,347 A | 12/1980 | Albanese et al. | |
| 6,147,572 A | 11/2000 | Kaminski et al. | |
| 6,414,631 B1 | 7/2002 | Fujimoto | |
| 6,636,174 B2 | 10/2003 | Arikan et al. | |
| 7,048,973 B2 | 5/2006 | Sakamoto et al. | |
| 7,057,564 B2 | 6/2006 | Tsai et al. | |
| 7,171,052 B2 | 1/2007 | Park | |
| 7,317,417 B2 | 1/2008 | Arikan et al. | |
| 7,596,241 B2 | 9/2009 | Rittscher et al. | |
| 7,692,574 B2 | 4/2010 | Nakagawa | |

(Continued)

FOREIGN PATENT DOCUMENTS

| | | |
|---|---|---|
| CN | 1463161 A | 12/2003 |
| CN | 1716695 A | 1/2006 |

(Continued)

OTHER PUBLICATIONS

Richards, Mark A., "Fundamentals of Radar Signal Processing," McGraw Hill Electronic Engineering, ISBN: 0-07-144474-2, Jun. 2005, 93 pages.

(Continued)

*Primary Examiner* — Harry K Liu
(74) *Attorney, Agent, or Firm* — Slater Matsil, LLP

(57) ABSTRACT

A method for calibration in a phased array antenna includes generating, by a master clock, a reference clock signal and generating an output signal corresponding to the reference clock signal by a phase-locked loop. The method further includes generating, by a local oscillator (LO), an LO signal corresponding to the output signal and generating a transmit calibration tone corresponding to a leakage of the LO signal and a direct current signal by an in-phase and quadrature (IQ) modulator. The method further includes receiving, by a phase detector in each of a plurality of RF devices in the phased array antenna, the transmit calibration tone and determining a relative phase shift between the transmit calibration tone and the reference clock signal received at an input of each of the plurality of RF devices by the phase detector.

20 Claims, 14 Drawing Sheets

(56) References Cited

U.S. PATENT DOCUMENTS

| | | |
|---|---|---|
| 7,873,326 B2 | 1/2011 | Sadr |
| 7,889,147 B2 | 2/2011 | Tam et al. |
| 8,228,382 B2 | 7/2012 | Pattikonda |
| 8,497,805 B2 | 7/2013 | Rofougaran et al. |
| 8,659,369 B2 | 2/2014 | Rofougaran et al. |
| 8,731,502 B2 | 5/2014 | Salle et al. |
| 8,836,596 B2 | 9/2014 | Richards et al. |
| 8,847,814 B2 | 9/2014 | Himmelstoss et al. |
| 8,860,532 B2 | 10/2014 | Gong et al. |
| 8,976,061 B2 | 3/2015 | Chowdhury |
| 9,172,132 B2 | 10/2015 | Kam et al. |
| 9,202,105 B1 | 12/2015 | Wang et al. |
| 9,413,079 B2 | 8/2016 | Kamgaing et al. |
| 9,495,600 B2 | 11/2016 | Heu et al. |
| 2003/0179127 A1 | 9/2003 | Wienand |
| 2004/0238857 A1 | 12/2004 | Beroz et al. |
| 2006/0001572 A1 | 1/2006 | Gaucher et al. |
| 2006/0049995 A1 | 3/2006 | Imaoka et al. |
| 2006/0067456 A1 | 3/2006 | Ku et al. |
| 2007/0210959 A1 | 9/2007 | Herd et al. |
| 2008/0106460 A1 | 5/2008 | Kurtz et al. |
| 2008/0238759 A1 | 10/2008 | Carocari et al. |
| 2008/0291115 A1 | 11/2008 | Doan et al. |
| 2008/0308917 A1 | 12/2008 | Pressel et al. |
| 2009/0073026 A1 | 3/2009 | Nakagawa |
| 2009/0085815 A1 | 4/2009 | Jakab et al. |
| 2009/0153428 A1 | 6/2009 | Rofougaran et al. |
| 2009/0315761 A1 | 12/2009 | Walter et al. |
| 2010/0207805 A1 | 8/2010 | Haworth |
| 2011/0133982 A1* | 6/2011 | Goshen ............... G01S 7/4004 342/174 |
| 2011/0299433 A1 | 12/2011 | Darabi et al. |
| 2012/0087230 A1 | 4/2012 | Guo et al. |
| 2012/0092284 A1 | 4/2012 | Rofougaran et al. |
| 2012/0116231 A1 | 5/2012 | Liao et al. |
| 2012/0195161 A1 | 8/2012 | Little et al. |
| 2012/0206339 A1 | 8/2012 | Dahl |
| 2012/0265486 A1 | 10/2012 | Klofer et al. |
| 2012/0268314 A1 | 10/2012 | Kuwahara et al. |
| 2012/0280900 A1 | 11/2012 | Wang et al. |
| 2013/0027240 A1 | 1/2013 | Chowdhury |
| 2013/0106673 A1 | 5/2013 | McCormack et al. |
| 2014/0028542 A1 | 1/2014 | Lovitt et al. |
| 2014/0070994 A1 | 3/2014 | Schmalenberg et al. |
| 2014/0145883 A1 | 5/2014 | Baks et al. |
| 2014/0324888 A1 | 10/2014 | Xie et al. |
| 2014/0348035 A1 | 11/2014 | Corman et al. |
| 2015/0181840 A1 | 7/2015 | Tupin, Jr. et al. |
| 2015/0185316 A1 | 7/2015 | Rao et al. |
| 2015/0212198 A1 | 7/2015 | Nishio et al. |
| 2015/0243575 A1 | 8/2015 | Strothmann et al. |
| 2015/0277569 A1 | 10/2015 | Sprenger et al. |
| 2015/0325925 A1 | 11/2015 | Kamgaing et al. |
| 2015/0346820 A1 | 12/2015 | Poupyrev et al. |
| 2015/0348821 A1 | 12/2015 | Iwanaga et al. |
| 2015/0364816 A1 | 12/2015 | Murugan et al. |
| 2015/0381228 A1 | 12/2015 | Milenkovic |
| 2016/0018511 A1 | 1/2016 | Nayyar et al. |
| 2016/0041617 A1 | 2/2016 | Poupyrev |
| 2016/0041618 A1 | 2/2016 | Poupyrev |
| 2016/0061942 A1 | 3/2016 | Rao et al. |
| 2016/0061947 A1 | 3/2016 | Patole et al. |
| 2016/0098089 A1 | 4/2016 | Poupyrev |
| 2016/0103213 A1 | 4/2016 | Ikram et al. |
| 2016/0109566 A1 | 4/2016 | Liu et al. |
| 2016/0118353 A1 | 4/2016 | Ahrens et al. |
| 2016/0135655 A1 | 5/2016 | Ahn et al. |
| 2016/0146931 A1 | 5/2016 | Rao et al. |
| 2016/0146933 A1 | 5/2016 | Rao et al. |
| 2016/0187462 A1 | 6/2016 | Altus et al. |
| 2016/0191232 A1 | 6/2016 | Subburaj et al. |
| 2016/0223651 A1 | 8/2016 | Kamo et al. |
| 2016/0240907 A1 | 8/2016 | Haroun |
| 2016/0249133 A1 | 8/2016 | Sorensen |
| 2016/0252607 A1 | 9/2016 | Saboo et al. |
| 2016/0259037 A1 | 9/2016 | Molchanov et al. |
| 2016/0266233 A1 | 9/2016 | Mansour |
| 2016/0269815 A1 | 9/2016 | Liao et al. |
| 2016/0291130 A1 | 10/2016 | Ginsburg et al. |
| 2016/0299215 A1 | 10/2016 | Dandu et al. |
| 2016/0306034 A1 | 10/2016 | Trotta et al. |
| 2016/0320852 A1 | 11/2016 | Poupyrev |
| 2016/0320853 A1 | 11/2016 | Lien et al. |
| 2016/0327633 A1 | 11/2016 | Kumar et al. |
| 2016/0334502 A1 | 11/2016 | Ali et al. |
| 2016/0349845 A1 | 12/2016 | Poupyrev et al. |
| 2017/0033062 A1 | 2/2017 | Liu et al. |
| 2017/0045607 A1 | 2/2017 | Bharadwaj et al. |
| 2017/0052618 A1 | 2/2017 | Lee et al. |
| 2017/0054449 A1 | 2/2017 | Mani et al. |
| 2017/0060254 A1 | 3/2017 | Molchanov et al. |
| 2017/0070952 A1 | 3/2017 | Balakrishnan et al. |
| 2017/0074974 A1 | 3/2017 | Rao et al. |
| 2017/0074980 A1 | 3/2017 | Adib et al. |
| 2017/0090014 A1 | 3/2017 | Subburaj et al. |
| 2017/0090015 A1 | 3/2017 | Breen et al. |
| 2017/0115377 A1 | 4/2017 | Giannini et al. |
| 2017/0131395 A1 | 5/2017 | Reynolds et al. |
| 2017/0139036 A1 | 5/2017 | Nayyar et al. |
| 2017/0141453 A1 | 5/2017 | Waelde et al. |
| 2017/0170947 A1 | 6/2017 | Yang |
| 2017/0176574 A1 | 6/2017 | Eswaran et al. |
| 2017/0192847 A1 | 7/2017 | Rao et al. |
| 2017/0201019 A1 | 7/2017 | Trotta |
| 2017/0212597 A1 | 7/2017 | Mishra |
| 2017/0257137 A1* | 9/2017 | Matsumura ............ H04B 17/14 |
| 2017/0364160 A1 | 12/2017 | Malysa et al. |
| 2018/0046255 A1 | 2/2018 | Rothera et al. |
| 2018/0101239 A1 | 4/2018 | Yin et al. |
| 2018/0115360 A1 | 4/2018 | Niknejad et al. |
| 2018/0175909 A1 | 6/2018 | Tiebout et al. |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| DE | 102008054570 A1 | 6/2010 |
| DE | 112009000053 T5 | 10/2010 |
| DE | 102010011429 A1 | 9/2011 |
| DE | 102011100907 A1 | 1/2012 |
| DE | 102011075725 A1 | 11/2012 |
| DE | 102014118063 A1 | 7/2015 |
| DE | 102016202652 A1 | 9/2016 |
| DE | 102016123459 B3 | 5/2018 |
| EP | 3157100 A2 | 4/2017 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |
| WO | 2007060069 A1 | 5/2007 |
| WO | 2013009473 A2 | 1/2013 |
| WO | 2016033361 A1 | 3/2016 |

OTHER PUBLICATIONS

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

(56) References Cited

OTHER PUBLICATIONS

Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.
Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.
Deacon, Peter et al., "Frequency Modulated Continuous Wave (FMCW) Radar," Design Team 6 Technical Lecture, Nov. 9, 2011, 27 pages.
Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.
Dooring Alert Systems, "Riders Matter," http:\\dooringalertsystems.com, printed Oct. 4, 2017, 16 pages.
Filippelli, Mario et al., "Respiratory dynamics during laughter," J Appl Physiol, (90), 1441-1446, Apr. 2001, http://jap.physiology.org/content/jap/90/4/1441.full.pdf.
Fox, Ben, "The Simple Technique That Could Save Cyclists' Lives," https://www.outsideonline.com/2115116/simple-technique-could-save-cyclists-lives, Sep. 19, 2016, 6 pages.
Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.
Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.
Inac, Ozgur et al., "A Phased Array RFIC with Built-In Self-Test Capabilities," IEEE Transactions on Microwave Theory and Techniques, vol. 60, No. 1, Jan. 2012, 10 pages.
Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.
Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.
Lim, Soo-Chul et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.
Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.
Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.
Simon, W., et al., "Highly Integrated KA-Band Tx Frontend Module Including 8×8 Antenna Array," IMST GmbH, Germany, Asia Pacific Microwave Conference, Dec. 7-10, 2009, 63 pages.
Suleymanov, Suleyman, "Design and Implementation of an FMCW Radar Signal Processing Module for Automotive Applications," Master Thesis, University of Twente, Aug. 31, 2016, 61 pages.
Thayananthan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.
Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.
Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.
Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, 11 pages.
Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.
Tiebout, M. et al., "Radio Frequency Device and Corresponding Method", U.S. Appl. No. 15/845,746, filed Dec. 18, 2017.
Jo, Ohyun et al., "Holistic Design Considerations for Environmentally Adaptive 60 GHz Beamforming Technology," IEEE Communications Magazine, Nov. 2014, 9 pages.
Kanar, T. et al., "A 2-15 GHz Built-in-Self-Test System for Wideband Phased Arrays Using Self-Correcting 8-State I/Q Mixers," IEEE MTT-S International Microwave Symposium (IMS), May 22-27, 2016, 4 pages.
"Transmit Receive Modules." Microwave101, The world's microwave information resource since 2001, Microwave101.com; https://www.microwaves101.com/encyclopedias/transmit-receive-modules; 5 pages, print Nov. 8, 2017.
Kim, S.Y. et al., "A 76-84GHz 16-Element Phased Array Receiver with a Chip—Level Built-In-Self-Test System", RM02D-4, IEEE Radio Frequency Integrated Circuits Symposium, Jun. 12, 2013, 4 pages.

\* cited by examiner

CALIBRATING A PHASED ARRAY SYSTEM

TECHNICAL FIELD

The present invention relates generally to a calibration method, and, in particular embodiments, to a system and method for calibrating a phased array antenna.

BACKGROUND

In a phased array antenna that includes an array of radio wave emitting antenna elements, each feed path to each antenna element is individually controlled. The combined beam, generated by the phased array antenna, is electronically steered to point to a desired direction.

As each emitted radio wave has a corresponding magnitude and phase component, by adjusting these two parameters using, for example, respectively a phase shifter and an attenuator, each radio wave emitted from each antenna element is individually controlled. Thus, by individually controlling each antenna element a desired beam is generated from the addition and suppression of the individual radiations.

In some phased array systems, the direction of the beam is calibrated by measuring the relative RF phase and amplitude for each feed path in the antenna, and adjusting the relative phase and amplitude to form a beam in a desired direction.

SUMMARY

In accordance with an embodiment, a phased array antenna includes a master clock, a phase-locked loop, a local oscillator (LO), an in-phase and quadrature (IQ) modulator, and a plurality of radio frequency (RF) devices. The master clock is configured to generate a reference clock signal. The phase-locked loop is configured to receive the reference clock signal and to generate an output signal. The LO is configured to receive the output signal and to generate an LO signal. The IQ modulator is configured to receive the LO signal and a direct current signal and to generate a transmit calibration tone. The plurality of RF devices are configured to receive, at an input of each of the plurality of RF devices, the transmit calibration tone from the IQ modulator. Each of the plurality of RF devices include a corresponding phase detector configured to calculate a relative phase shift between the transmit calibration tone and the reference clock signal received at an input of each of the plurality of RF devices.

In accordance with another embodiment, a phased array antenna includes a master clock, a plurality of radio frequency (RF) devices, and an in-phase and quadrature (IQ) modulator. The master clock is configured to generate a reference clock signal and each of the plurality of RF devices includes a phase-locked loop (PLL), a local oscillator (LO), and a coupler. The PLL is configured to receive the reference clock signal and to generate an output signal. The LO is configured to receive the output signal and to generate a corresponding receive calibration tone. The coupler is configured to couple the corresponding receive calibration tone into a receive path of the phased array antenna. The IQ modulator is configured to receive the corresponding receive calibration tone and the reference clock signal to determine a relative phase shift between the corresponding receive calibration tone and the reference clock signal for each of the plurality of RF devices.

In accordance with yet another embodiment, a method of calibration in a phased array antenna includes generating, by a master clock, a reference clock signal and generating an output signal corresponding to the reference clock signal by a phase-locked loop (PLL). The method further includes generating, by a local oscillator (LO), an LO signal corresponding to the output signal and generating a transmit calibration tone corresponding to a leakage of the LO signal and a direct current (DC) signal by an in-phase and quadrature (IQ) modulator. The method further includes receiving, by a phase detector in each of a plurality of RF devices in the phased array antenna, the transmit calibration tone and determining a relative phase shift between the transmit calibration tone and the reference clock signal received at an input of each of the plurality of RF devices by the phase detector.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
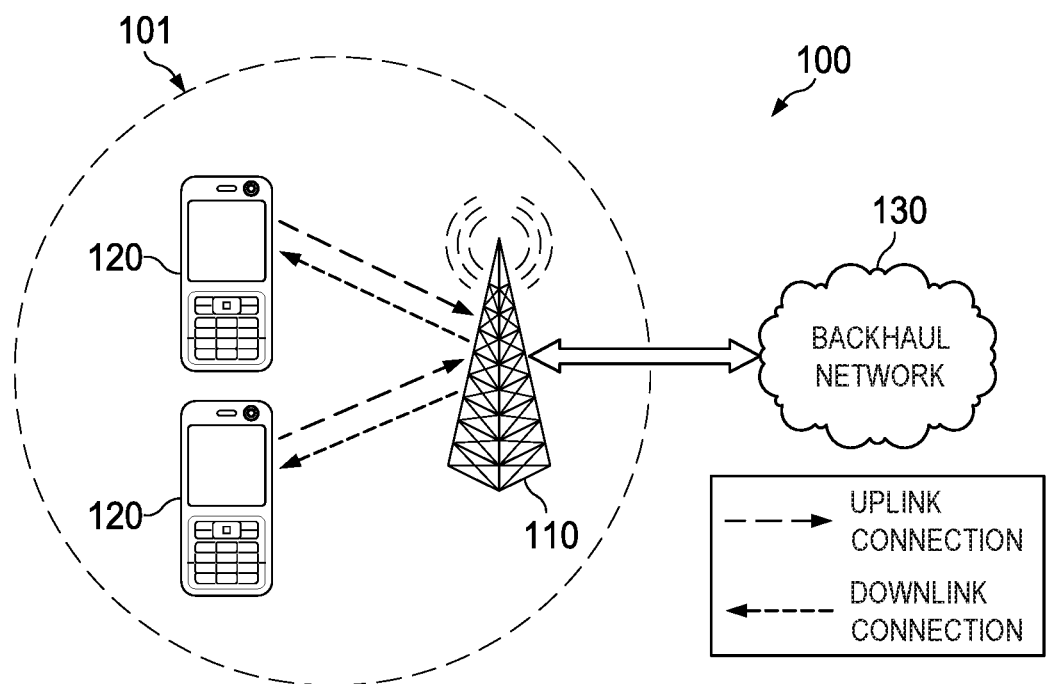
FIG. 1 is a diagram of an embodiment wireless communications network.

The structure, manufacture, and use of embodiments are discussed in detail below. It should be appreciated, however, that this disclosure provides many applicable inventive concepts that can be embodied in a wide variety of specific contexts. The specific embodiments discussed are merely illustrative of specific ways to make and use the invention, and do not limit the scope of the invention. In addition, apart from features or elements explicitly shown in the drawings or described herein, further features or elements, for example features or elements conventionally used in phased array systems, may be provided.

Features from different embodiments may be combined to form further embodiments unless noted otherwise. Variations or modifications described with respect to one of the embodiments may also be applicable to other embodiments.

Phased array antennas are suitable for use in a number of applications, such as telecommunications, automotive radar, industrial radar, gesture sensors, and motion detectors. In telecommunication applications, multichannel transceivers may be used for point-to-point communication where beamforming is needed. For example, upcoming 5$^{th}$ generation (5G) mobile technologies may employ various features that utilize multiple antenna elements such as adaptive beamforming for dedicated users, smart antenna scenarios, transmit diversity, and multiple input, multiple output (MIMO) configurations.

The present disclosure will be described with respect to embodiments in a specific context, radio frequency (RF) device modules, and a phased array antenna that may be used in RF systems such as radar systems and cellular communication systems. Embodiments of the present invention may also be applied to other systems and applications that receive or transmit directional RF signals.

In a phased array antenna of a radar or a telecommunication system used for antenna beam pattern forming (i.e., beamforming), beamforming is achieved by applying phase and amplitude weights to the transmission lines feeding each element of the phased array antenna.

Typically, in a phased array antenna, because of design and manufacturing inconsistencies, or from environmental degradation, a relative RF variance and control signal variance may exist at and between each RF channel. To compensate for these differences and to improve beam steering accuracy, the phased array antenna generally goes through an initial and/or a periodic calibration procedure.

Some methods used to calibrate a phased array antenna are far field calibration, near field calibration, mutual coupling calibration, or the use of a built in test equipment (BITE) of the phased array antenna.

In the far field calibration method, the phase array beam pattern is calibrated over the air in an anechoic chamber or in an outdoor antenna measurement setup. In the near field calibration method, the beam pattern is measured indirectly by measuring the near field distribution of signals at the antenna element openings. In the mutual coupling calibration method, the mutual coupling among antenna elements is used to couple the different phase array antenna channels into a measurement receiver.

In a calibration method that uses the built in test equipment, test circuitry built in to the various components may be used to measure the relative phase and amplitude of the RF channels in an RF module. However, the relative phase and the relative amplitude of the RF channels of different RF modules are not easily calibrated.

Embodiments of this disclosure provide techniques for measuring the relative amplitude and phase differences of each RF path, in both the transmit and in the receive directions using the BITE of the phased array antenna. In particular, existing hardware in a phased array antenna may be used to generate communication signals for the calibration of the system, which can be applied in both analog and digital domains. These and other details are discussed in greater detail below.

Figure 2:
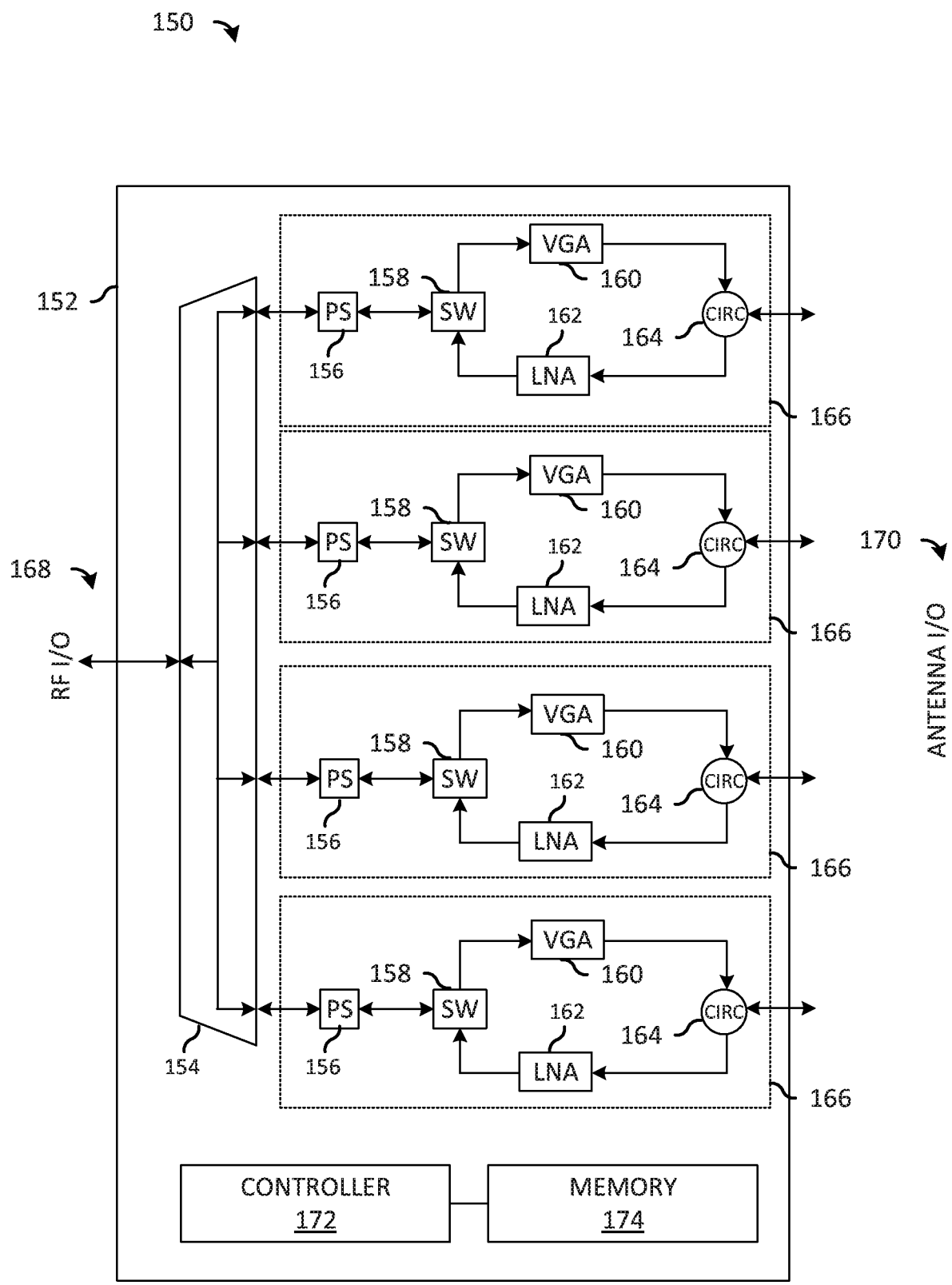
FIG. 2 is a block diagram of an embodiment radio frequency (RF) module.

A diagram of an embodiment wireless communications network is described using FIG. 1. In FIG. 2, a block diagram of an embodiment radio frequency (RF) module is described. A block diagram of an embodiment RF module having additional calibration circuitry is described in FIG. 3. In FIG. 4, a block diagram of an embodiment phased array antenna is described. A block diagram of an embodiment phased array antenna for calibrating the transmit path in production is described in FIG. 5. In FIG. 6 a block diagram of an embodiment phased array antenna for calibrating the receive path in production is described. A diagram of an embodiment frame format for messaging between a base station and a user equipment in the wireless communications network is described in FIG. 7. In FIG. 8 a block diagram of an embodiment phased array antenna for periodic calibration in the transmit path, as performed by a base station is described. A block diagram of an embodiment phased array antenna for periodic calibration in the receive path, as performed by a base station is described in FIG. 9. In FIG. 10 a flowchart of an embodiment method for periodic calibration of the transmit path in a phased array antenna, as performed by a base station is described. A flowchart of an embodiment method for periodic calibration of the receive path in a phased array antenna, as performed by a base station is described in FIG. 11. In FIG. 12, a block diagram of an embodiment for generating a CW calibration tone and measuring phase, respectively in transmit and in receive, using an analog circuit is described. A block diagram of an embodiment for generating a CW calibration tone and measuring phase, respectively in transmit and in receive, using a digital circuit is described in FIG. 13. In FIG. 14, a block diagram of an embodiment IQ demodulator is described. In the following disclosure, the same elements are designated with the same reference numbers in the various Figures.

FIG. 1 is diagram of a network 100 for communicating data. The network 100 includes a base station no having a coverage area 101, a plurality of UEs 120, and a backhaul network 130. As shown, the base station no establishes uplink (dashed line) and/or downlink (dotted line) connections with the UEs 120, which serve to carry data from the UEs 120 to the base station no and vice-versa. Data carried over the uplink/downlink connections may include data communicated between the UEs 120, as well as data communicated to/from a remote-end (not shown) by way of the backhaul network 130.

The term "base station" refers to any component (or collection of components) configured to provide wireless access to the network 100, such as an enhanced Node B (eNodeB or eNB), a transmit/receive point (TRP), a macrocell, a femtocell, a Wi-Fi Access Point (AP), or other wirelessly enabled devices. Base stations may provide wireless access in accordance with one or more wireless communication protocols, e.g., 5th generation new radio (5G_NR), Long-Term Evolution (LTE), LTE advanced (LTE-A), High Speed Message Access (HSPA), Wi-Fi 802.11a/b/g/n/ac, etc. The term "UE" refers to any component (or collection of components) capable of establishing a wireless connection with the base station 110, such as a mobile device, a mobile station (STA), and other wirelessly enabled devices. In some embodiments, the network 100 may include various other wireless devices, such as relays, low power nodes, etc.

FIG. 2 illustrates a block diagram 150 of an embodiment radio frequency (RF) module 152 that includes an RF input/output (I/O) port 168, an RF power combiner/splitter 154, and, at each respective channel 166, an RF phase shifter 156, an RF switch 158, a power amplifier (PA) 160, a low noise amplifier (LNA) 162, an RF circulator 164, and an antenna I/O port 170. The RF module 152 is a component of the base station 110, as shown in FIG. 1. The RF module 152 in FIG. 2 is shown having four RF channels 166, however an RF module with one RF channel or an RF module with more than four RF channels may also be contemplated.

The arrangements of the components in the RF module 152 illustrate an embodiment configuration and other configurations are also possible, such as having the RF circulator 164 and the RF power combiner/splitter 154 external to the RF module or having a second RF switch instead of the RF circulator 164. Additionally, one or more components of the RF module 152 may be integrated in a single chip, or alternatively may be provided in separate chips. As an example, the RF phase shifter 156 and the RF switch 158 may be integrated in a single semiconductor chip.

In transmit mode, the RF power combiner/splitter 154 receives an RF signal from the RF input/output (I/O) port 168 of the RF module 152. The RF power combiner/splitter 154 divides the RF signal into multiple RF signals. Each channel 166 of the RF module 152 includes a phase shifter 156 that receives one of the split signals from the RF power combiner/splitter 154. The phase shifter 156 is used to change the phase angle of the received signal. The phase shifter 156 is typically controlled using a control signal to set the value of the phase shifter in accordance with the desired change in phase angle.

The control signal may be communicated to the phase shifter using a controller 172. The controller 172 may be a separate component such as an application specific integrated circuit (ASIC), a microcontroller, a field programmable gate array (FPGA), or any other device capable of controlling the phase shifter 156. The controller 172 may use information stored in the memory 174 to determine the appropriate phase of the phase shifter 156. In some embodiments, the controller 176 may receive data signals from an external device to the RF module 152 to set the appropriate values of the phase shifters 156.

The RF switch 158 is set for the signal to be received at the power amplifier 160. The power amplifier 160 may be a variable gain amplifier (VGA) or in some embodiments may consist of an attenuator and an amplifier, arranged as separate components. In either configuration, the power amplifier 160 amplifies the received signal in accordance with a gain value that may be adjusted through a control signal using, for example, the controller 172 and the memory 174. The RF circulator 164 receives the signal from the power amplifier 160 and directs the signal to the antenna elements to be radiated by the antenna at the respective antenna I/O 170.

In receive mode, the RF circulator 164 receives a signal from the antenna element at each antenna I/O 170 and directs the received RF signal to the LNA 162. The LNA 162 receives and amplifies the signal. The LNA may also attenuate the received signal using, for example, an RF limiter type circuit. The RF switch 168 is set for the signal, amplified by the LNA 162, to be received by the phase shifter 156. The phase shifter 156 is generally a reciprocal network circuit, meaning that in a two-port RF circuit, the resulting phase angle change is applied at a signal received at either port of the phase shifter 156. However, in some embodiments, the transmit path and the receive path may have separate phase shifters. The signal at each channel is combined through the RF power combiner/splitter 154 and directed to the RF I/O port 168. Similar to the transmit path, the phase shifter 156 in the receive path can be controlled using, for example, the controller 172, the memory 174, and/or an external data input.

Figure 3:
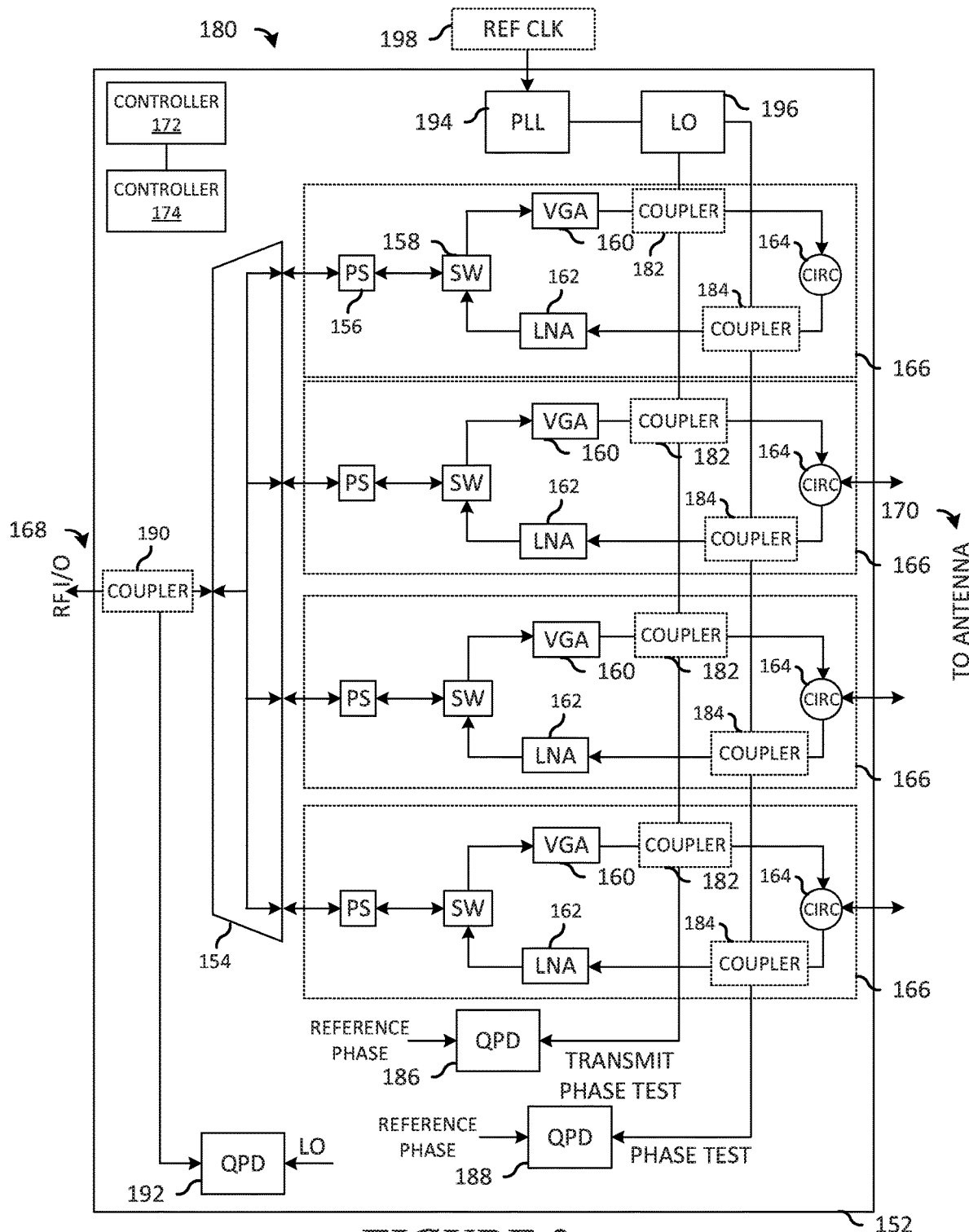
FIG. 3 is a block diagram of an embodiment RF module having additional calibration circuitry.
Figure 4:
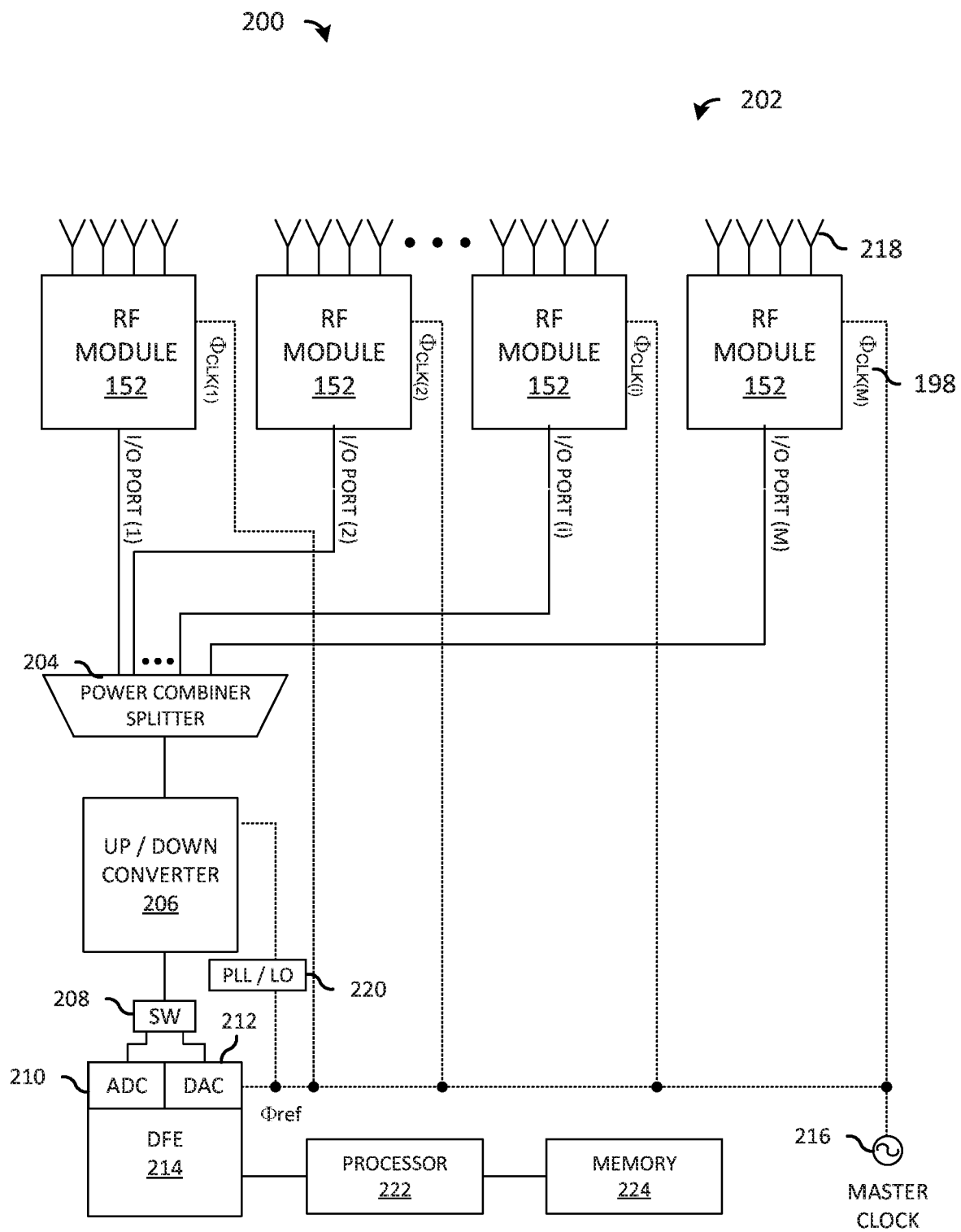
FIG. 4 is a block diagram of an embodiment phased array antenna.

FIG. 3 illustrates a block diagram 180 of the embodiment RF module 152 having additional circuitry for calibration, commonly known as the built in test equipment (BITE). As illustrated, the BITE circuitry may include a phase-locked loop (PLL) circuit 194, a local oscillator (LO) 196, a transmit/receive coupler 190 at the RF I/O port, several quadrature phase detectors 186, 188, and 192 (QPD), and at each channel 166, a transmit path coupler 182 and a receive path coupler 184. The BITE circuitry may be used to calibrate the phase and amplitude at the RF channels of the RF module 152.

The phase-locked loop (e.g., charge pumped PLL) circuit 194 and the local oscillator 196 generate a calibration signal based on the reference clock signal 198. The reference clock signal 198 is generated from an external master clock signal external to the RF module 152 that may be common to the RF modules 152 of the phased array antenna. The LO frequency may be set near the RF operating frequency of the RF module 152. However, in some embodiments, the LO frequency may be set at double the operating frequency of the RF module 152. As an example, in an RF module 152 operating at 28 Gigahertz (GHz), the LO frequency may be at 28 GHz or 56 GHz. As another example, in the RF module 152 operating at 28 GHz, the LO frequency may be at 56 GHz and a frequency divider in the BITE may generate a signal at 28 GHz.

Generally, for measuring relative phase, test signals are sent through the various signal paths. The phase difference of the test signals travelling through the signal paths are measured at each quadrature phase detector 186, 188, and 192, with respect to a reference signal source. In some embodiments, the reference signal may be the output signal of the LO 196 to determine the relative phase offset at each RF channel 166 of the RF module 152.

FIG. 4 illustrates a block diagram 200 of an embodiment phased array antenna 202, with M-number RF modules 152, a power combiner/splitter 204, an up/down converter 206, a switch 208, an analog-to-digital converter (ADC) 210, a digital-to-analog converter (DAC) 212, a digital front end (DFE) 214, a master clock 216, a processor 222, and a memory 224. Each RF module 152 in FIG. 4 is shown to have four antenna elements 218; however, an RF module 152 with greater or lesser number of antenna elements may be contemplated.

In a communication transmission, the digital front end 214 and the processor 222 generate a digital representation of the communication signal that is to be transmitted by the phased array antenna 202. The digital communication signal is converted to an analog signal using the DAC 212. The switch 208 is set for the transmit path and the analog signal is received at the up/down converter 206. An LO signal is generated at the phase-locked loop circuit/local oscillator 220 using a reference clock signal from the master clock 216. The analog signal is up-converted at the up/down converter 206, using a mixer and the input LO signal, to an RF frequency. The power combiner/splitter 204, splits the RF signal, which is transmitted by each of the plurality of RF modules 152 using the antenna elements 218.

In a communication reception, one or all the RF modules 152 receive an RF signal through the antenna elements 218. The RF signal from each RF module 152 is combined at the power combiner/splitter 204. The combined RF signal is then down-converted by the down-converter circuit of the up/down converter 206. An LO signal is generated at the phase-locked loop circuit/local oscillator 220. The input to the phase-locked loop circuit/local oscillator 220 is the reference clock signal from the master clock 216. The switch 208 is set for receive and the ADC 210 converts the analog signal to a digital signal, which is processed by the processor 222.

The memory 224 may be used to store calibration measurements or calibration settings of each of the RF modules 152. The memory 224 may also be used to store processor-executable instructions to be processed by the processor 222. The memory 224 may be implemented as a non-transitory processor-readable medium (e.g., electrically erasable programmable read-only memory (EEPROM), etc.). The non-transitory medium could include one or more solid-state memory devices and/or memory devices with movable and possibly removable storage media.

In both receive and transmit, the master clock 216 may be used to generate a reference clock signal at the phase-locked loop circuit/local oscillator 220, the digital front end 214, and at each RF module 152. The reference clock signal may be used to synchronize the phase of each of the generated signals.

With reference to FIGS. 3-4, it should be noted that due to the relative difference in length in the clock signal path from the master clock 216 and each RF module 152, at each reference clock signal 198 there is a relative phase difference ($\Delta\Phi_{CLK(i)}$). As a result, the LO signal generated by the RF module 152, using the phase-locked loop circuit 194 and the local oscillator 196 in the BITE circuitry, is out of phase relative to an LO signal generated in a second RF module 152. The measurement of the relative RF line length differences ($\Delta\Phi_{RF(i)}$), the relative clock length differences ($\Delta\Phi_{CLK(i)}$), and the compensation of these differences using the phase shifters during calibration allows for the proper operation of the phased array antenna 202.

If not calibrated, the variations in the electrical lengths of the RF path in transmit cause signals propagating through different I/O ports to have different phases ($\Phi_{RF(i)}$). Likewise, if the receive path is not calibrated, the RF signals at the different I/O ports are summed out of phase at the power splitter/combiner 204.

Figure 5:
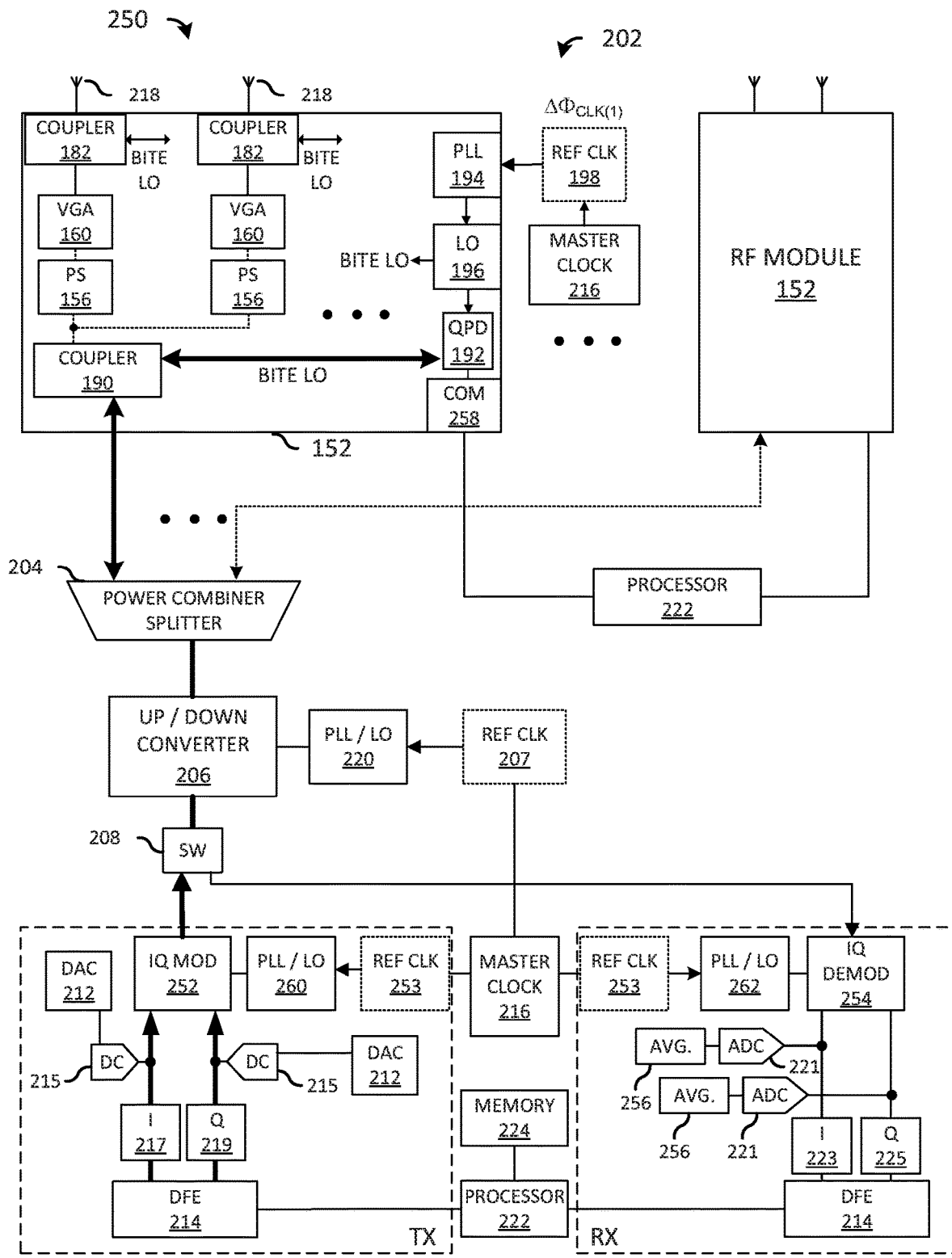
FIG. 5 is a block diagram of an embodiment phased array antenna for calibrating the transmit path in production.
Figure 6:
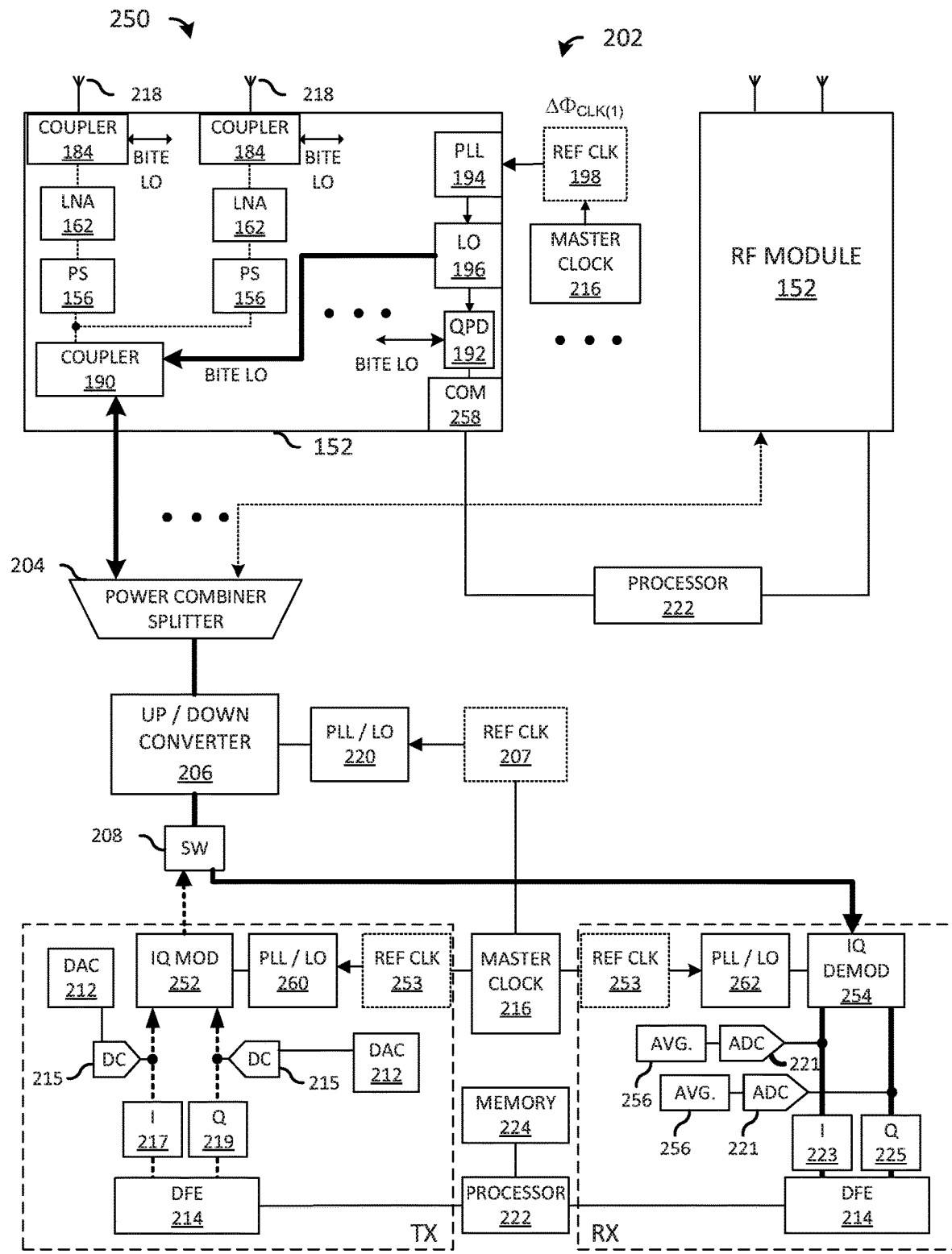
FIG. 6 is a block diagram of an embodiment phased array antenna for calibrating the receive path in production.

FIG. 5 illustrates a block diagram 250 of an embodiment phased array antenna 202 for generating a transmit path calibration tone. The phased array antenna 202 in FIG. 5 includes, in addition to components previously disclosed in FIG. 4, an in-phase and quadrature (IQ) modulator 252, a transmit path phase-locked loop circuit/local oscillator 260, an IQ demodulator 254, receive path phase-locked loop circuit/local oscillator 262, a pair of ADC 221 circuits, and a pair of averaging units 256.

Each RF module 152 also includes a communication interface circuit 258 (e.g., a serial peripheral interface (SPI), an inter-integrated circuit (I2C) interface, an improved inter-integrated circuit (I3C) interface, a mobile industry processor interface (MIPI), etc.). The communication interface circuit 258 may be used to send calibration values from the RF module 152 to the processor 222 of the phased array antenna 202.

In the communication transmission previously described, the IQ modulator 252 generates a complex modulated communication signal, at an intermediate frequency (e.g., 5 GHz). The input to the IQ modulator 252 are an in-phase (I) component signal 217 and a quadrature (Q) component signal 219—90 degrees offset in phase from the I component signal 217. The I component signal 217 and the Q component signal 219 in the IQ modulator 252 modulate the LO signal to generate the modulated signal, which is "carried" at the intermediate frequency (IF). To generate a signal at the IF frequency, the transmit path phase-locked loop circuit/local oscillator 260 generates an LO signal, using the reference clock signal 253 synchronized with the master clock 216, which is also fed to the IQ modulator 252. The frequency of the LO signal from the transmit path phase-locked loop circuit/local oscillator 260 is at the IF frequency.

In an embodiment, the IQ modulator 252 may be additionally used for transmit path calibration of the phased array antenna 202. The IQ modulator may generate a CW calibration tone using two DC inputs 215 that adjust the LO leakage at the IQ modulator 252. In some embodiments, the DC inputs 215 may be an output generated from the DAC 227, the DFE 214, and the processor 222.

Typically during communication transmission, the LO leakage at the IQ modulator 252 is an undesired output, which is suppressed by applying a direct current (DC) offset using the two DC inputs 215. However, to generate a CW calibration tone, the DC offsets can be adjusted to enhance the LO leakage, and by switching OFF the communication signal at the I and the Q ports of the IQ modulator 252, the LO leakage can be advantageously utilized.

Similar to the process used to generate the modulated tone signal in the communication transmission, the LO signal generated by the transmit path phase-locked loop circuit/local oscillator 260 is used to convert the adjusted LO leakage to the CW calibration tone at the intermediate frequency.

The IF CW calibration tone is up-converted using the up/down converter 204 to an RF CW calibration tone. The phase-locked loop circuit/local oscillator 220 receives a reference clock signal 207 from the master clock 216 and generates an LO signal, which is an input to the up/down converter 206. The frequency of the LO signal is advantageously selected to generate the RF signal at the output of the mixer in the up-converter circuit of the up/down converter 204. As an example, to generate an RF signal—at the output of the up/down converter 204—at or near 28 GHz with an input IF CW calibration tone having a frequency of 5 GHz, the frequency of the LO signal at the output of the phase-locked loop circuit/local oscillator 220 may be at or near 23 GHz.

The RF CW calibration tone is split at the power combiner/splitter 204 and received at each RF module 152 input. A portion of the RF CW calibration tone is coupled to the quadrature phase detector (QPD) 192 at the coupler 190 of the RF module 152. The phase-locked loop 194 receives the reference clock signal 198 from the master clock 216. The phase-locked loop 194 and the local oscillator 196 generate a BITE LO signal at the RF module 152. The local oscillator 196 may be selected such that the frequency of the BITE LO signal at the output of the local oscillator 196 may be at the frequency of the RF CW calibration tone.

The quadrature phase detector 192 receives the coupled RF CW calibration tone and the BITE LO signal as input signals and determines the relative phase difference. The relative phase difference is communicated to the processor 222 from the quadrature phase detector 192 using the communication interface circuit 258.

U.S. patent application Ser. No. 15/845,746 ('746 patent application) discloses methods to determine the relative phase offset of the reference clock between the RF modules 152. The '746 patent application is incorporated herein by reference in its entirety. The relative phase difference of the RF transmit path at each RF module can then be calculated using methods disclosed in the '746 patent application in conjunction with the output of the quadrature phase detector 192 at the processor 222.

FIG. 6 illustrates a block diagram 300 of an embodiment phased array antenna 202 for generating a receive path calibration tone. The phase-locked loop 194 and the local oscillator 196 receive a reference clock signal 198 from the master clock 216 and generate a BITE LO signal. To generate a RF CW calibration tone in the receive path, the BITE LO signal is used as the RF CW calibration tone signal.

In an embodiment, the local oscillator 196 may generate the BITE LO signal at the RF operating frequency of the RF module 152 (e.g., 28 GHz). However, in some embodiments, the local oscillator 196 may generate a RF signal at a multiple (i.e., N-times) of the operating frequency, for example at double the operating frequency. An N:1 frequency divider may be used to generate the BITE LO signal at the operating frequency of the RF module 152.

To determine the calibration parameters, the other RF modules 152 are in an OFF state or a deactivated state. The RF CW calibration tone signal is coupled at the coupler 190, which traverses through the power combiner/splitter 204 to the up/down converter 206. The up/down converter 206 down-converts the RF CW calibration tone signal to an IF frequency (e.g., 5 GHz). The phase-locked loop 220 and local oscillator 220 receive the reference clock signal 207 from the master clock 216 to generate an LO signal with a frequency equal to the difference between the RF and IF.

The IF CW calibration tone signal is received at the IQ demodulator 254 and demodulated to an I baseband signal 223 and a Q baseband signal 225 receive component. The LO signal generated by the receive path phase-locked loop circuit/local oscillator 262 from the reference clock signal at near the IF frequency and a mixer in the IQ demodulator converts the IF CW calibration tone signal to the baseband frequency. The baseband signal is a near DC signal modulated by the phase noise of the IQ modulator LO and the phase noise of the input IF signal.

The ADC 221 converts the I baseband signal 223 and the Q baseband signal 225 respectively to a digital I baseband signal and a digital Q baseband signal. An averaging unit 256, such as a low pass (LP) averaging filter, may be used to average the digital I baseband signal and the digital Q baseband signal and by doing so removes the phase noise from the I and Q baseband signals. The averaging, or filtering, is to minimize the phase noise effects at the various LO signals. Similar to the transmit path calibration, the '746 patent application may be used to determine the relative phase difference of the RF receive paths of the RF modules 152.

As the electrical length of the RF paths and the electrical length of the clock line paths depend mostly on the printed circuit board (PCB) layout routing, the relative difference at each channel remains fairly constant during the operation of the phased array antenna 202. Thus, the receive and transmit calibration, discussed above, can be performed at production of the device.

However, it is also advantageous to periodically calibrate or recalibrate a phased array antenna 202 during regular operation in the field. A variety of factors such as environmental conditions (e.g., temperature variations) and component aging can result in electrical and mechanical property changes of the semiconductor circuits, which may result in a phase or amplitude calibration change at the phased array antenna 202.

In an embodiment where the various phase-locked loop synthesizers of the phased array antenna 202 are of the integer-N phase-locked loop synthesizer type (i.e., the up/down converter phase-locked loop 220, the IQ modulator phase-locked loop 260, the IQ demodulator phase-locked loop 262, BITE phase-locked loop 194, etc.), the frequency of the receive signal is equal to the frequency of the LO signal and a fairly accurate measurement can be made. In such an embodiment, the various phase-locked loop synthesizers are locked to the same clock reference, or to integer multiples of the clock reference.

However, in a phased array antenna 202 that uses fractional-N phase-locked loop synthesizers, a slow drift in frequency can occur over time, which can be corrected through periodic calibration of the phased array antenna 202.

Figure 7:
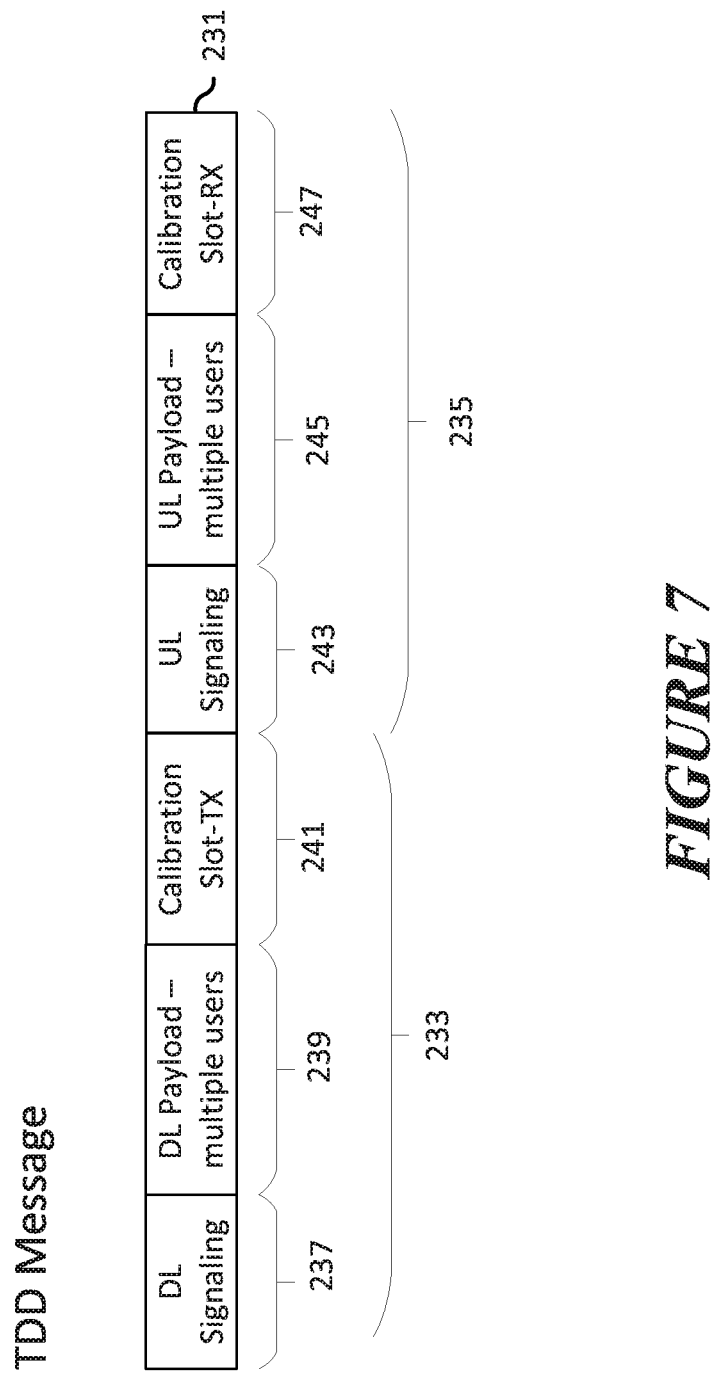
FIG. 7 is a diagram of an embodiment frame format for messaging between a base station and a user equipment in the wireless communications network.
Figure 8:
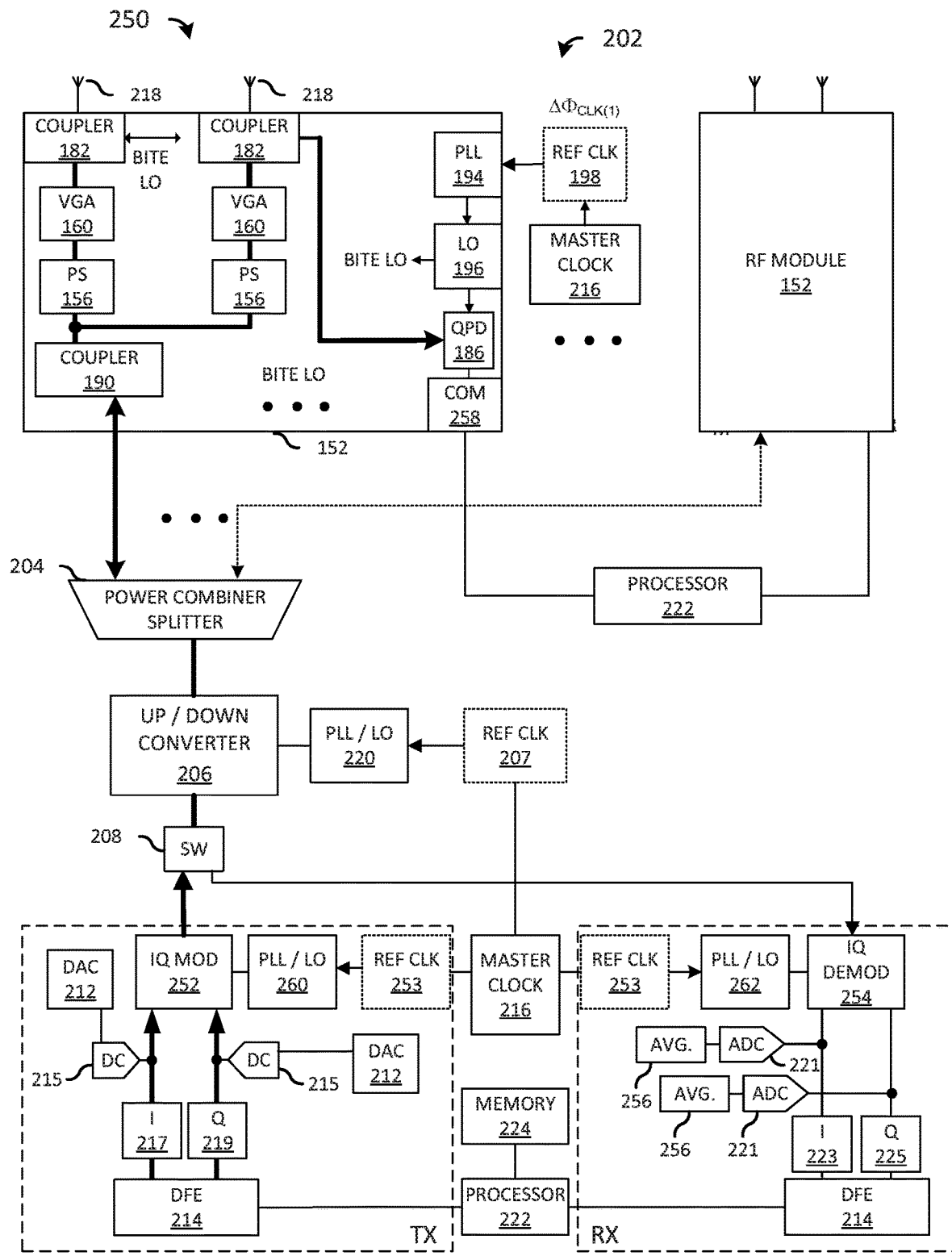
FIG. 8 is a block diagram of an embodiment phased array antenna for periodic calibration in the transmit path, as performed by a base station.

FIG. 7 illustrates a frame format for an embodiment message 231 that can be used for calibration in the field. The embodiment message 231 includes a downlink portion 233 and an uplink portion 235. The downlink portion 233 includes a downlink signaling portion 237, a downlink payload portion 239 (optional support for multiple users), and a calibration slot-transmit portion 241. The uplink portion 235 includes an uplink signaling portion 243, an uplink payload portion 245 (optional support for multiple users), and a calibration slot-receive portion 247.

The downlink-signaling portion 237 is used for sending of a signal from the transmitting end (i.e., base station) to inform the receiving end (i.e., UE) that a message is to be communicated in that direction. The downlink payload 239 is the message that is communicated from the base station no to the one or more UEs 120 of FIG. 1. The calibration slot-transmit portion 241 is used for sending details of the transmit path calibration of the phased array antenna of the base station no.

The uplink-signaling portion 243 is used for sending of a signal from the UE 120 to inform the base station no that a message is to be communicated in that direction. The uplink payload portion 245 is the message that is communicated from the UE 120 to the base station no. The calibration slot—receive portion 247 is used for sending details of the receive path calibration of the phased array antenna of the base station no.

The downlink-signaling portion 237 and the uplink-signaling portion 243 carry the control information. The control information can include the modulation format used in the message 231 or the payload resource allocation to each of the UEs 120. The downlink-signaling portion 237 and the uplink-signaling portion 243 can also be used to indicate the starting time and the length of the associated TX calibration slot 241 and RX calibration slot 247 in the message 231. The UE 120, after receiving and decoding the signaling that indicates the time and length of the calibration period in the message 231, may be configured to withhold transmitting or receiving of signals during these calibration tone periods.

FIG. 8 is a block diagram 255 of an embodiment phased array antenna 202 for periodic calibration in the transmit path, as performed by a base station no. It is noted, that the relative difference between the electrical length of the RF path and the clock line path, at each RF module 152, can be determined during production. Thus, a system calibration in the field may be completed by determining the shift in the phase and amplitude at each phase shifting RF chain of the RF modules 152.

In a periodic transmit calibration and similar to the production calibration, a continuous wave (CW) calibration tone is generated at the IQ modulator 252 by applying DC offsets—using the DC inputs 215—to enhance the LO leakage of the IQ modulator 252. The generated CW calibration tone is at the intermediate frequency, which is then up-converted to the RF frequency at the up/down converter 206 and carried through each RF channel of the phased array antenna 202.

In each RF module 152, the RF CW transmit path calibration tone is coupled at the a transmit path coupler 182 and compared with the BITE LO signal at the quadrature phase detector 186. As the relative phase difference between the clock line paths of each RF module 152 is known, and as the BITE LO signal at each RF module 152 is generated using a reference clock signal 198 from a master clock 216, the relative phase difference of each BITE LO signal can be determined.

As a result, the BITE LO signal may be used as a phase reference in each of the RF channels across the RF modules 152. The relative phase difference between the RF channels in the transmit path may therefore be obtained using the BITE LO signal with, for example, the quadrature phase detector 186. In an embodiment phased array antenna 202, where a quadrature phase detector 186 is located at each RF channel, several RF branches can be measured simultaneously.

As the calibration signal is received at each of the antenna ports 218 of the phased array antenna 202, the CW calibration tone is outwardly radiated from the base station no. However, as the UEs 120 receive the resource allocation and the signaling information in the downlink portion 233 of the message 231, the UEs 120 remain inactive during the transmit path calibration.

It should also be noted that a transmission mask defines the shape of a transmitted spectrum in order to control interference in a network. The transmission masks differ in a variety of ways, such as in operation frequency or system type and are defined/standardized through various standardization bodies, such as the International Telecommunications Union (ITU), the European Telecommunications Standards Institute (ETSI), the American National Standards Institute (ANSI), the Third Generation Partnership Program (3GPP), or similar. The moderate changes from temperature and aging allow for a slow triggering of the periodic calibration. Even though the periodic calibration may cause a transmission mask violation, to overcome the transmission mask violation, the phased array antenna 202 can be configured to have a fraction of the RF branches to be calibrated at the same time. As an example, in an embodiment, the phased array antenna 202 may be configured to have one RF branch to be calibrated at a time. In other embodiments, the RF power of the calibration tone can be set to a minimum value required for successful calibration of the phased array antenna 202 within the boundaries of avoiding a transmission mask violation.

Figure 9:
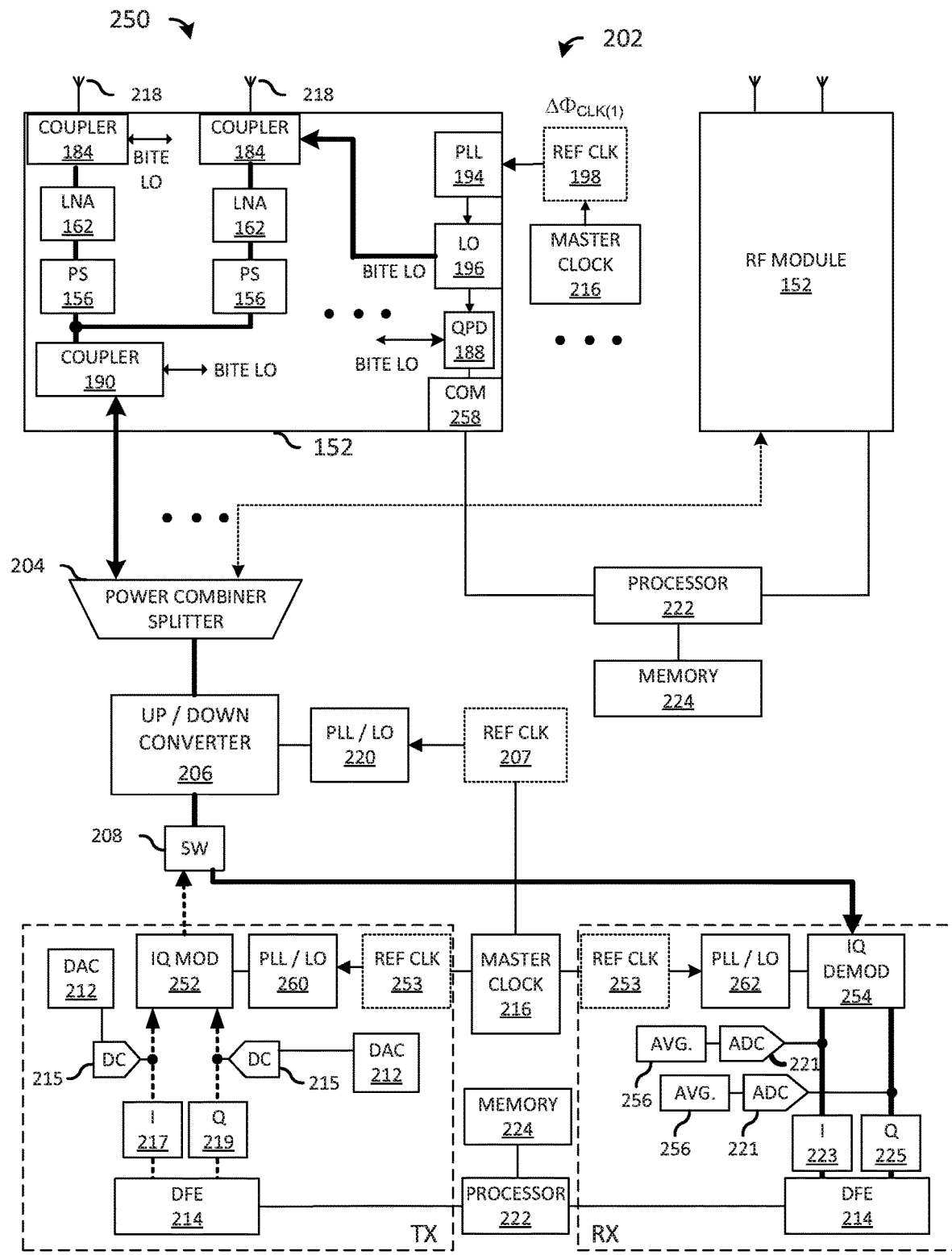
FIG. 9 is a block diagram of an embodiment phased array antenna for periodic calibration in the receive path, as performed by a base station.
Figure 10:
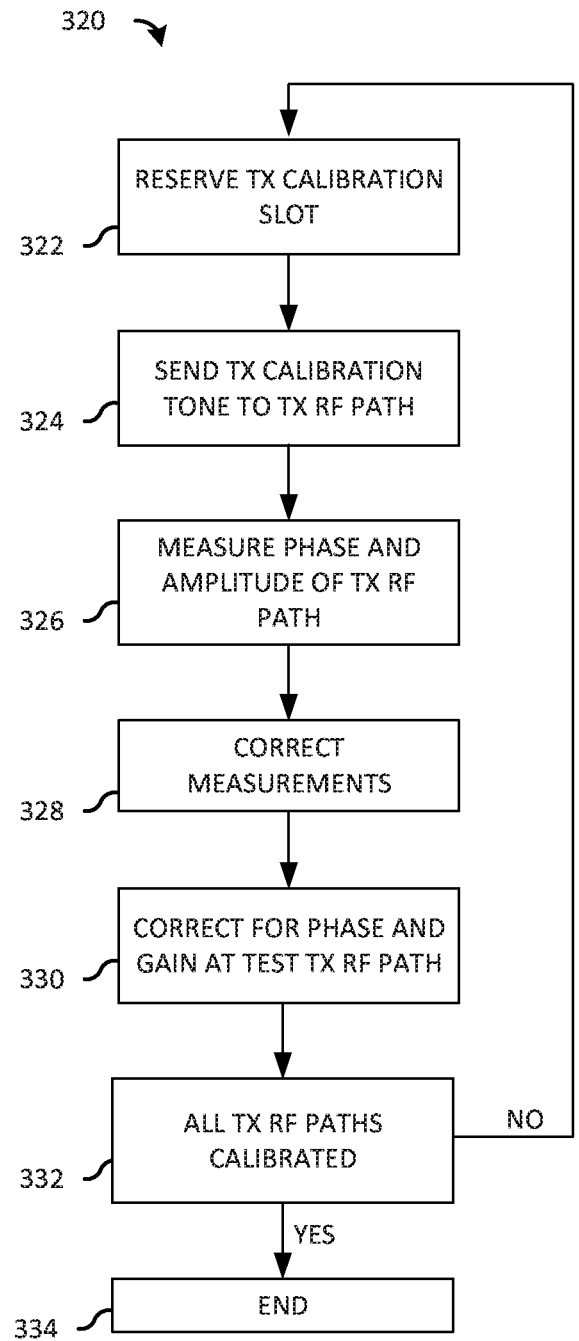
FIG. 10 is a flowchart of an embodiment method for periodic calibration of the transmit path in a phased array antenna, as performed by a base station.

FIG. 9 is a block diagram 255 of an embodiment phased array antenna 202 for periodic calibration in the receive path, as performed by a base station no. The UEs 120 are configured to not transmit during the receive calibration period upon receiving the message 231 and decoding the uplink portion 235. A receive calibration tone is injected in the RF receive channel being calibrated using the BITE LO signal from the phase-locked loop (PLL) circuit 194 and local oscillator 196. The signal is coupled into the receive path using the coupler 184. The RF calibration signal travels from the RF module 152 to the IQ demodulator 254.

The signal is received at the IQ demodulator 254 and demodulated to an I baseband signal 223 and a Q baseband signal 225 receive component. The LO signal generated by the receive path phase-locked loop circuit/local oscillator 262 down-converts the signal to the baseband frequency at near DC.

The ADC 221 converts the I baseband signal 223 and the Q baseband signal 225 respectively to a digital I baseband signal and a digital Q baseband signal. An averaging unit 256, such as a low pass (LP) averaging filter, may be used to average the digital I baseband signal and the digital Q baseband signal and remove the phase noise in the I and Q baseband signals Similar to the transmit path periodic calibration, the relative phase difference between the RF channels in the receive path may be obtained using the relative phase difference between the clock line paths of each RF module 152 and the common reference clock signal from the master clock 216.

The number of parallel calibration measurements in the embodiment of FIG. 9 is correlated with the number of IQ demodulators 254 in the phased array antenna 202. Even in an embodiment that has a single IQ demodulator 254, the moderate changes resulting from aging and temperature variation allow for the recalibration to be performed sequentially at each RF branch.

FIG. 10 is a flowchart 320 of an embodiment method for periodic calibration of the transmit path in a phased array antenna 202, as performed by a base station 110. At step 322, the base station no transmits a signaling message 231 to the UEs 120 in its coverage area, to reserve a portion of time for the calibration in the transmit path. The UEs 120 remain inactive for the indicated time period and do not receive any signal from the base station 110.

At step 324, the IQ modulator 252 generates a CW IF calibration tone, which is up-converted and transmitted through each RF channel. At step 326, the amplitude and phase of the RF channels in the transmit path are measured and at step 328, the measurements are corrected using the known phase offsets from the calibration performed during production.

At step 330, the phase and gain of the RF channels are set using the phase shifters 156 and at the variable gain amplifiers 160. If at step 332, all RF channels have been calibrated, the process is complete at step 334. Otherwise, the process is repeated for the remaining RF channels.

Figure 11:
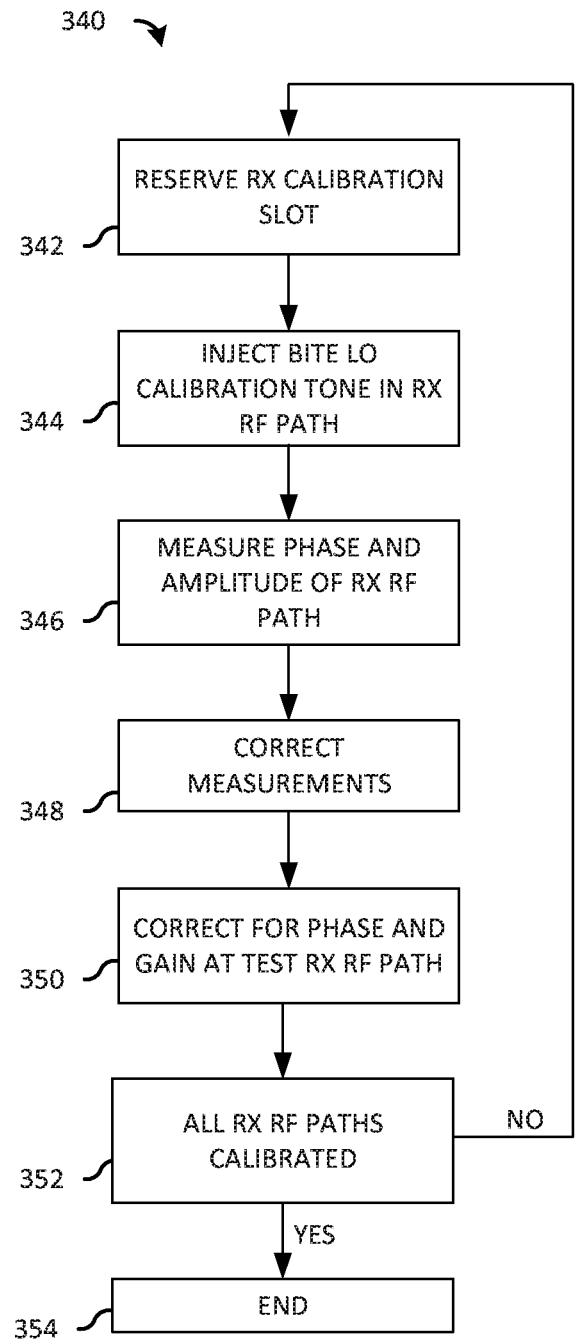
FIG. 11 is a flowchart of an embodiment method for periodic calibration of the receive path in a phased array antenna, as performed by a base station.
Figure 12:
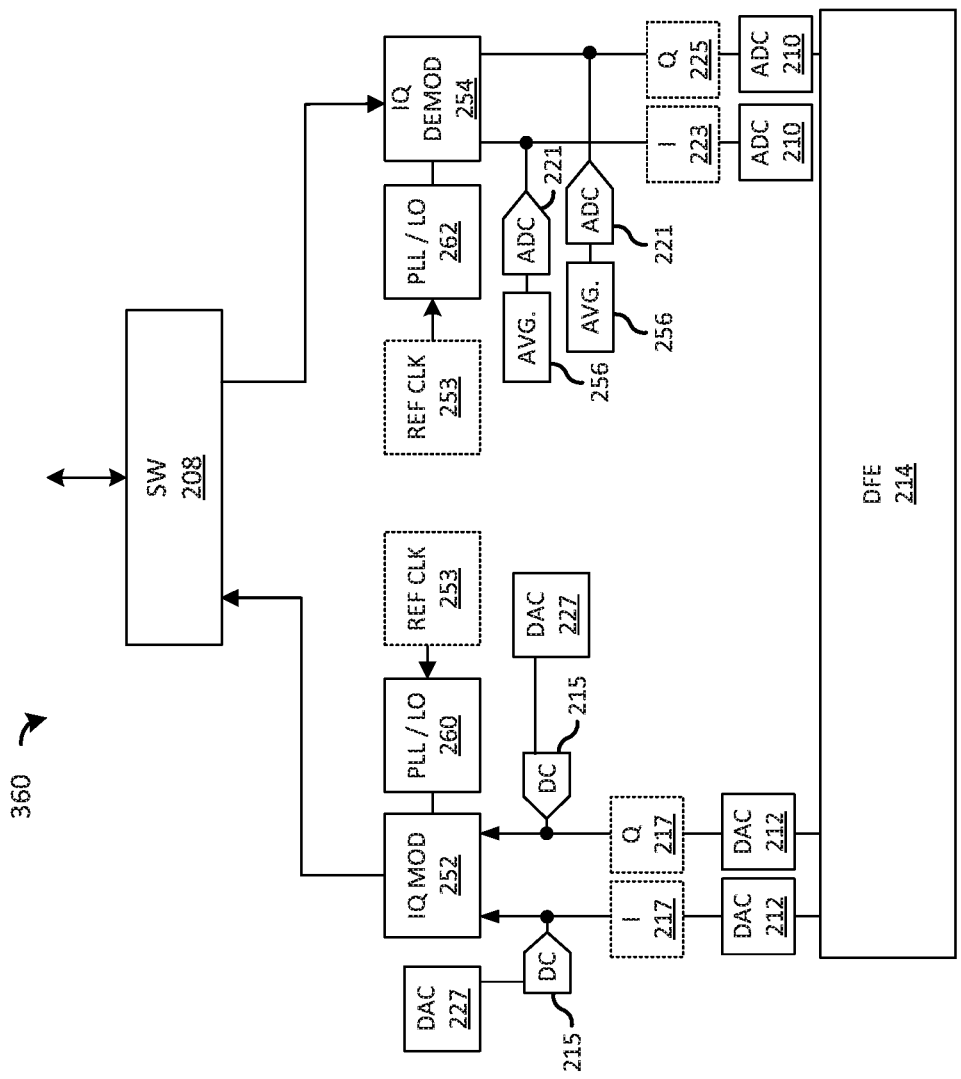
FIG. 12 is a block diagram of an embodiment for generating a CW calibration tone and measuring phase, respectively in transmit and in receive, using an analog circuit.

FIG. 11 is a flowchart 340 of an embodiment method for periodic calibration of the receive path in a phased array antenna 202, as performed by a base station 110. At step 342, the base station no transmits a signaling message 231 to the UEs 120 in its coverage area, to reserve a portion of time for the calibration in the receive path. The UEs 120 remain inactive for the indicated time period and do not transmit any signal to the base station 110.

At step 344, the BITE LO calibration tone is injected at an RF channel of an RF module 152. At step 346, the amplitude and phase of the RF channels in the receive path are measured and at step 348, the measurements are corrected using the known phase offsets from the calibration performed during production. At step 350, the phase and gain of the RF channels are set using phase shifters 156 and attenuators in the LNAs 162. If at step 352, all RF channels have been calibrated, the process is complete at step 354. Otherwise, the process is repeated for the remaining RF channels.

FIG. 12 illustrates a block diagram 360 of an embodiment for generating a CW calibration tone and measuring phase, respectively in transmit and in receive, using an analog circuit. Typically, in transmit, the digital front end 214, generates a digital I component signal 217 and a digital Q component signal 219. The DAC 212 converts the digital I and Q components to analog signals.

In embodiments of this disclosure and for purposes of transmit path calibration, the IQ modulator 252 generates a modulated CW calibration tone at the intermediate frequency by applying DC offsets—using the DC inputs 215 and the DAC 227—to enhance the LO leakage of the IQ modulator 252. It should be noted that in these embodiments, the I component signal 217 and Q component signal 219 are turned off during calibration.

Typically in receive, the calibration signal from each RF module 152 is down-converted to an intermediate frequency and is received at the switch 208. The IQ demodulator 254 generates an analog I baseband signal 223 and an analog Q baseband signal 225 component from the analog IF communication signal. The ADC 210 converts these analog signal components to a digital representation, which is received at the digital front end 214.

In embodiments of this disclosure and for purposes of receive path calibration, a receive path RF calibration signal is received at the ADC 221, which is converted to a digital representation used to determine the phase shifter and attenuator settings in the RF module 152.

Figure 13:
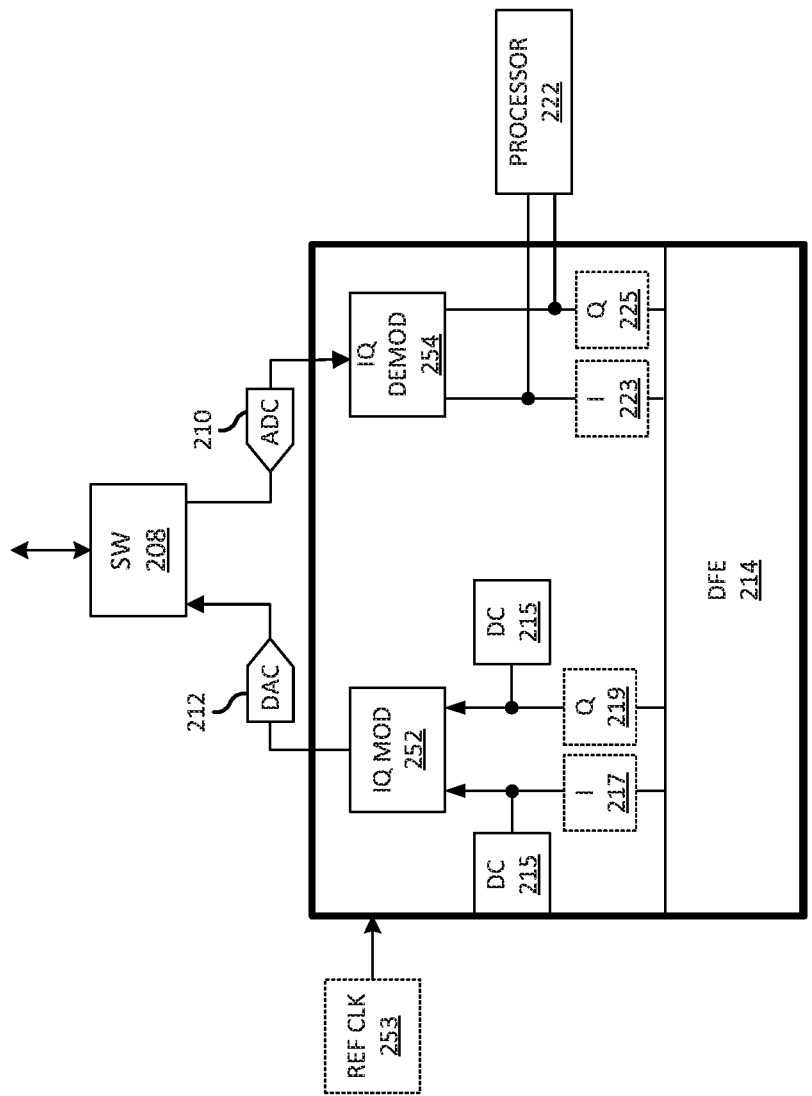
FIG. 13 is a block diagram of an embodiment for generating a CW calibration tone and measuring phase, respectively in transmit and in receive, using a digital circuit.
Figure 14:
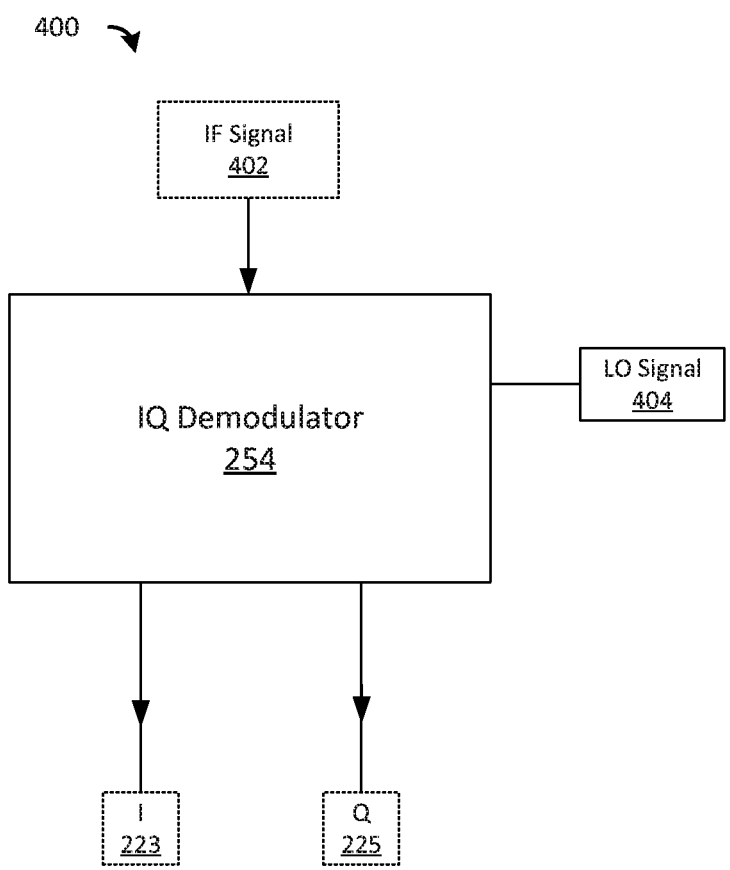
FIG. 14 is a block diagram of an embodiment IQ demodulator.

FIG. 13 illustrates a block diagram 380 of an embodiment for generating a CW calibration tone and measuring phase, respectively in transmit and in receive, using a digital circuit. Typically, in transmit, the digital front end 214, generates a digital I signal and a digital Q signal to generate a CW calibration tone. During communication transmission, the DC input 215 adds DC offsets to the digital I signal and to the digital Q signal to suppress the LO leakage of the IQ modulator 252.

In embodiments of this disclosure and for purposes of transmit path calibration, the IQ modulator 252 generates a digital modulated CW calibration tone at the intermediate frequency. The DAC 212 converts the digital modulated CW calibration tone to an analog representation which is transmitted through the transmit path to each of the RF modules 152. The I component signal 217 and Q component signal 219 are turned off during calibration.

Typically, in receive, an analog signal is received at the ADC 210 and converted to a digital value. The signal is then demodulated at the IQ demodulator 254 to a I component signal 223 and a Q component signal 225. The demodulated signals are then received at the digital front end 214 during communication reception.

In embodiments of this disclosure and for purposes of receive path calibration, the combined calibration signal from the RF modules 152, is demodulated at the IQ demodulator 254 and a phase measurement device such as the processor 222 is used to determine the differences in phase in each receive path RF chain.

FIG. 14 is a block diagram 400 of an embodiment IQ demodulator 254. The IQ demodulator 254 receives an intermediate frequency (IF) signal 402 corresponding to the signal generated by the phase-locked loop (PLL) circuit 194 and the local oscillator (LO) 196 in the RF module 152 that is traversed through the receive path of the phased array antenna 202. The IQ demodulator 254 also receives an LO signal 404 from the receive path phase-locked loop circuit/local oscillator 262. The LO signal 404 and the IF signal 402 at the input of the IQ demodulator 254 are generated with respect to a shared master clock 216 and are at a same operating frequency. The I 223 and the Q 225 output signal components of the IQ demodulator 254 are DC corrupted by the phase noise of the LO signal 404 and the IF signal 402.

In an embodiment, by averaging the I 223 and the Q 225 output signal components and by processing the resulting DC components, a relative phase information corresponding to the relative phase difference between the LO signal 404 (i.e., reference signal) and the IF signal 402 can be calculated. The phase of the IF signal 402 relative to the LO signal 404 can be calculated using the equation: $\Phi=\text{ArcTan}(DC\_Q/DC\_I)$, where DC_I and DC_Q are respectively the DC components of the I 223 and Q 225 output signal components of the IQ demodulator 254. In embodiments of this disclosure, each RF module 152 sequentially generates an IF signal 402 and a corresponding relative phase difference to a reference (i.e., LO signal 404) is calculated for each beamforming RF module 152.

It should be noted that the relative phase measurements are independent of the amplitude of the IF signal 402 generated by each RF module 152. In other words, different IF signals, from each RF module 152, injected at the input of the IQ demodulator 254 having a same relative phase but different amplitudes will have the same calculated relative phase difference. This is because the ratio of the DC components of the I 223 and Q 225 output signal components are used in the phase calculation.

Even though internally generated DC offsets, at the I 223 and Q 225 output signal components, may be used for the purposes of this disclosure, the accuracy of the measurements, in an embodiment where the I 223 and the Q 225 output signal components are DC coupled, may increase the accuracy in the relative phase measurements.

The proposed methods and solutions discussed in this disclosure are not limited and can be used in a variety of both radar and communication systems. An example of a communication system that may use the methods of this disclosure is a time division duplex (TDD) radio communication system. As a base station is less constrained by size or cost requirements, a $5^{th}$ generation (5G) base station may have a phased array as part of a transceiver. In this context, the base station will be the device that is calibrated and the one or more UEs (e.g., mobile phones, laptops, M2M devices, etc.) that connect to the base station, having simpler antennas with a broader beam pattern, require simpler calibration procedures.

Example embodiments of the present invention are summarized here. Other embodiments can also be understood from the entirety of the specification and the claims filed herein.

Example 1. A phased array antenna includes a master clock, a phase-locked loop, a local oscillator (LO), an in-phase and quadrature (IQ) modulator, and a plurality of radio frequency (RF) devices. The master clock is configured to generate a reference clock signal. The phase-locked loop is configured to receive the reference clock signal and to generate an output signal. The LO is configured to receive the output signal and to generate an LO signal. The IQ modulator is configured to receive the LO signal and a direct current signal and to generate a transmit calibration tone. The plurality of RF devices are configured to receive, at an input of each of the plurality of RF devices, the transmit calibration tone from the IQ modulator. Each of the plurality of RF devices include a corresponding phase detector configured to calculate a relative phase shift between the transmit calibration tone and the reference clock signal received at an input of each of the plurality of RF devices.

Example 2. The phased array antenna of example 1, further including a non-transitory memory storage including relative phase difference of the reference clock signal received at the input of each of the plurality of RF devices.

The phased array antenna further includes a processor in communication with the non-transitory memory storage and each of the plurality of RF devices. The processor configured to receive the relative phase shift from each of the plurality of RF devices and determine a corresponding phase shift adjustment for each of the plurality of RF devices in accordance with the relative phase shift and the relative phase difference of the reference clock signal.

Example 3. The phased array antenna of example 1 or 2, where each of the plurality of RF devices further include a device processor configured to determine a phase setting in accordance with the corresponding phase shift adjustment and a phase shifter configured to receive the phase setting and to adjust a phase angle of a transmit RF signal in accordance with the phase setting.

Example 4. The phased array antenna of examples 1 or 2, further including a digital-to-analog converter (DAC) configured to generate the DC signal.

Example 5. The phased array antenna of examples 1 or 2, where each of the plurality of RF devices further includes a communication interface configured to receive the corresponding phase shift adjustment from the processor.

Example 6. The phased array antenna of examples 1, 2, or 5, where the communication interface is a serial peripheral interface (SPI), an inter-integrated circuit (I2C) interface, an improved inter-integrated circuit (I3C) interface, or a mobile industry processor interface (MIPI).

Example 7. The phased array antenna of example 1, where the IQ modulator configured to generate a transmit calibration tone further includes applying the DC signal to an LO leakage of the LO signal in the IQ modulator.

Example 8. A phased array antenna includes a master clock, a plurality of radio frequency (RF) devices, and an in-phase and quadrature (IQ) modulator. The master clock is configured to generate a reference clock signal and each of the plurality of RF devices includes a phase-locked loop (PLL), a local oscillator (LO), and a coupler. The PLL is configured to receive the reference clock signal and to generate an output signal. The LO is configured to receive the output signal and to generate a corresponding receive calibration tone. The coupler is configured to couple the corresponding receive calibration tone into a receive path of the phased array antenna. The IQ modulator is configured to receive the corresponding receive calibration tone and the reference clock signal to determine a relative phase shift between the corresponding receive calibration tone and the reference clock signal for each of the plurality of RF devices.

Example 9. The phased array antenna of example 8, further including a non-transitory memory storage including relative phase difference of the reference clock signal received at an input of each of the plurality of RF devices. The phased array antenna further includes a processor in communication with the non-transitory memory storage and each of the plurality of RF devices. The processor is configured to determine a corresponding phase shift adjustment for each of the plurality of RF devices in accordance with the relative phase shift and the relative phase difference of the reference clock signal.

Example 10. The phased array antenna of examples 8 or 9, where each of the plurality of RF devices further include a device processor configured to determine a phase setting in accordance with the corresponding phase shift adjustment and a phase shifter configured to receive the phase setting and to adjust a phase angle of a receive RF signal in accordance with the phase setting.

Example 11. The phased array antenna of examples 8 or 9, where each of the plurality of RF devices further includes a communication interface configured to receive the corresponding phase shift adjustment from the processor.

Example 12. The phased array antenna of examples 8, 9, or 11, where the communication interface is a serial peripheral interface (SPI), an inter-integrated circuit (I2C) interface, an improved inter-integrated circuit (I3C) interface, or a mobile industry processor interface (MIPI).

Example 13. The phased array antenna of example 8, further including averaging circuit configured to filter LO signal phase noise effects of the phased array antenna at an output of the IQ modulator.

Example 14. The phased array antenna of example 8, where the coupler configured to couple the corresponding receive calibration tone into a receive path of the phased array antenna is at a receive input of each of the plurality of RF devices.

Example 15. A method of calibration in a phased array antenna includes generating, by a master clock, a reference clock signal and generating an output signal corresponding to the reference clock signal by a phase-locked loop (PLL). The method further includes generating, by a local oscillator (LO), an LO signal corresponding to the output signal and generating a transmit calibration tone corresponding to a leakage of the LO signal and a direct current (DC) signal by an in-phase and quadrature (IQ) modulator. The method further includes receiving, by a phase detector in each of a plurality of RF devices in the phased array antenna, the transmit calibration tone and determining a relative phase shift between the transmit calibration tone and the reference clock signal received at an input of each of the plurality of RF devices by the phase detector.

Example 16. The method of example 15, further including receiving, by a processor, the relative phase shift from each of the plurality of RF devices and determining a corresponding phase shift adjustment for each of the plurality of RF devices in accordance with the relative phase shift and a relative phase difference of the reference clock signal stored in a memory.

Example 17. The method of examples 15 or 16, further including determining, by a device processor in each of the plurality of RF devices, a phase setting in accordance with the corresponding phase shift adjustment and adjusting, by a phase shifter in each of the plurality of RF devices, a phase angle of a transmit RF signal in accordance with the phase setting.

Example 18. The method of example 15, further including generating the DC signal, by a digital-to-analog converter (DAC).

Example 19. The method of example 15, further including transmitting, by each of the plurality of RF devices, a message to a user equipment (UE) in a coverage area of the phased array antenna. The message indicating a period of time reserved for calibrating the phased array antenna in a downlink path. The UE configured to not receive during the period of time reserved for calibration in accordance with the message.

Example 20. The method of example 19, where the message includes at least information on a modulation format, payload resource allocation of the UE, a calibration start time, or a period of time reserved for calibration.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A phased array antenna comprising:
a master clock configured to generate a reference clock signal;
a phase-locked loop (PLL) configured to receive the reference clock signal and to generate an output signal;
a local oscillator (LO) configured to receive the output signal and to generate an LO signal;
an in-phase and quadrature (IQ) modulator configured to receive the LO signal and a direct current (DC) signal and to generate a transmit calibration tone; and
a plurality of radio frequency (RF) devices configured to receive, at an input of each of the plurality of RF devices, the transmit calibration tone from the IQ modulator, each of the plurality of RF devices comprising a corresponding phase detector configured to calculate a relative phase shift between the transmit calibration tone and the reference clock signal received at an input of each of the plurality of RF devices.

2. The phased array antenna of claim 1, further comprising:
a non-transitory memory storage comprising relative phase difference of the reference clock signal received at the input of each of the plurality of RF devices;
a processor in communication with the non-transitory memory storage and each of the plurality of RF devices, the processor configured to:
receive the relative phase shift from each of the plurality of RF devices; and
determine a corresponding phase shift adjustment for each of the plurality of RF devices in accordance with the relative phase shift and the relative phase difference of the reference clock signal.

3. The phased array antenna of claim 2, wherein each of the plurality of RF devices further comprise:
a device processor configured to determine a phase setting in accordance with the corresponding phase shift adjustment; and
a phase shifter configured to receive the phase setting and to adjust a phase angle of a transmit RF signal in accordance with the phase setting.

4. The phased array antenna of claim 2, further comprising a digital-to-analog converter (DAC) configured to generate the DC signal.

5. The phased array antenna of claim 2, wherein each of the plurality of RF devices further comprises a communication interface configured to receive the corresponding phase shift adjustment from the processor.

6. The phased array antenna of claim 5, wherein the communication interface is a serial peripheral interface (SPI), an inter-integrated circuit (I2C) interface, an improved inter-integrated circuit (I3C) interface, or a mobile industry processor interface (MIPI).

7. The phased array antenna of claim 1, wherein the IQ modulator configured to generate a transmit calibration tone further comprises applying the DC signal to an LO leakage of the LO signal in the IQ modulator.

8. A phased array antenna comprising:
a master clock configured to generate a reference clock signal;
a plurality of radio frequency (RF) devices, each of the plurality of RF devices comprising:
a phase-locked loop (PLL) configured to receive the reference clock signal and to generate an output signal;
a local oscillator (LO) configured to receive the output signal and to generate a corresponding receive calibration tone; and
a coupler configured to couple the corresponding receive calibration tone into a receive path of the phased array antenna; and
an in-phase and quadrature (IQ) modulator configured to receive the corresponding receive calibration tone and the reference clock signal to determine a relative phase shift between the corresponding receive calibration tone and the reference clock signal for each of the plurality of RF devices.

9. The phased array antenna of claim 8, further comprising:
a non-transitory memory storage comprising relative phase difference of the reference clock signal received at an input of each of the plurality of RF devices; and
a processor in communication with the non-transitory memory storage and each of the plurality of RF devices, the processor configured to determine a corresponding phase shift adjustment for each of the plurality of RF devices in accordance with the relative phase shift and the relative phase difference of the reference clock signal.

10. The phased array antenna of claim 9, wherein each of the plurality of RF devices further comprise:
a device processor configured to determine a phase setting in accordance with the corresponding phase shift adjustment; and
a phase shifter configured to receive the phase setting and to adjust a phase angle of a receive RF signal in accordance with the phase setting.

11. The phased array antenna of claim 9, wherein each of the plurality of RF devices further comprises a communication interface configured to receive the corresponding phase shift adjustment from the processor.

12. The phased array antenna of claim 11, wherein the communication interface is a serial peripheral interface (SPI), an inter-integrated circuit (I2C) interface, an improved inter-integrated circuit (I3C) interface, or a mobile industry processor interface (MIPI).

13. The phased array antenna of claim 8, further comprising averaging circuit configured to filter LO signal phase noise effects of the phased array antenna at an output of the IQ modulator.

14. The phased array antenna of claim 8, wherein the coupler configured to couple the corresponding receive calibration tone into a receive path of the phased array antenna is at a receive input of each of the plurality of RF devices.

15. A method of calibration in a phased array antenna, the method comprising:
generating, by a master clock, a reference clock signal;
generating, by a phase-locked loop (PLL), an output signal corresponding to the reference clock signal;
generating, by a local oscillator (LO), an LO signal corresponding to the output signal;
generating, by an in-phase and quadrature (IQ) modulator, a transmit calibration tone corresponding to a leakage of the LO signal and a direct current (DC) signal;
receiving, by a phase detector in each of a plurality of RF devices in the phased array antenna, the transmit calibration tone; and determining, by the phase detector, a relative phase shift between the transmit calibration tone and the reference clock signal received at an input of each of the plurality of RF devices.

16. The method of claim 15, further comprising:
receiving, by a processor, the relative phase shift from each of the plurality of RF devices; and
determining a corresponding phase shift adjustment for each of the plurality of RF devices in accordance with the relative phase shift and a relative phase difference of the reference clock signal stored in a memory.

17. The method of claim 16, further comprising:
determining, by a device processor in each of the plurality of RF devices, a phase setting in accordance with the corresponding phase shift adjustment; and
adjusting, by a phase shifter in each of the plurality of RF devices, a phase angle of a transmit RF signal in accordance with the phase setting.

18. The method of claim 15, further comprising generating the DC signal, by a digital-to-analog converter (DAC).

19. The method of claim 15, further comprising transmitting, by each of the plurality of RF devices, a message to a user equipment (UE) in a coverage area of the phased array antenna, the message indicating a period of time reserved for calibrating the phased array antenna in a downlink path, the UE configured to not receive during the period of time reserved for calibration in accordance with the message.

20. The method of claim 19, wherein the message comprises at least information on a modulation format, payload resource allocation of the UE, a calibration start time, or a period of time reserved for calibration.

* * * * *